(12) United States Patent
Graefe et al.

(10) Patent No.: US 12,198,049 B2
(45) Date of Patent: Jan. 14, 2025

(54) VEHICLE DATA RELATION DEVICE AND METHODS THEREFOR

(71) Applicant: Intel Corporation, Santa Clara, CA (US)

(72) Inventors: Ralf Graefe, Haar (DE); Neslihan Kose Cihangir, Munich (DE)

(73) Assignee: Intel Corporation, Santa Clara, CA (US)

( * ) Notice: Subject to any disclaimer, the term of this patent is extended or adjusted under 35 U.S.C. 154(b) by 699 days.

(21) Appl. No.: 17/211,930

(22) Filed: Mar. 25, 2021

(65) Prior Publication Data

US 2021/0232836 A1 Jul. 29, 2021

(51) Int. Cl.
*G06V 10/00* (2022.01)
*G06F 18/24* (2023.01)
(Continued)

(52) U.S. Cl.
CPC .............. *G06N 3/08* (2013.01); *G06F 18/24* (2023.01); *G06V 10/25* (2022.01); *G06V 20/20* (2022.01);
(Continued)

(58) Field of Classification Search
CPC .......... G06N 3/08; G06N 3/045; G06N 3/048; G06N 20/00; G06F 18/24; G06V 10/25; G06V 20/20; G06V 20/58; G06V 20/597; G06V 20/70; G10L 15/083; G10L 2015/088; B60K 35/28; B60K 2360/146; B60K 2360/148; B60K 2360/149; B60K 2360/175; B60K 2360/179; B60K 2360/48; B60K 2360/583; B60K 35/10;
(Continued)

(56) References Cited

U.S. PATENT DOCUMENTS 10,759,447 B2    9/2020    Inaba
11,274,929 B1 *  3/2022    Afrouzi ..................... G06T 7/62
(Continued)

OTHER PUBLICATIONS

Bloomberg Quicktake; "These Humans Are Teaching Cars to Drive"; https://www.youtube.com/watch?v=jrVwqQVCrLw; YouTube; retrieved on Mar. 11, 2021, 1 page.
(Continued)

*Primary Examiner* — Frank F Huang
(74) *Attorney, Agent, or Firm* — Viering, Jentschura & Partner mbB

(57) ABSTRACT

A vehicle data relation device includes an internal audio/image data analyzer, configured to receive first data representing at least one of audio from within the vehicle or an image from within the vehicle; identify within the first data second data representing an audio indicator or an image indicator, wherein the audio indicator is human speech associated with a significance of an object external to the vehicle, and wherein the image indicator is an action of a human within the vehicle associated with a significance of an object external to the vehicle; an external image analyzer, configured to receive third data representing an image of a vicinity external to the vehicle; identify within the third data an object corresponding to at least one of the audio indicator or the video indicator; and an object data generator, configured to generate data corresponding to the object.

23 Claims, 10 Drawing Sheets

(51) Int. Cl.
*G06N 3/08* (2023.01)
*G06V 10/25* (2022.01)
*G06V 20/20* (2022.01)
*G06V 20/58* (2022.01)
*G06V 20/59* (2022.01)
*G06V 20/70* (2022.01)
*G10L 15/08* (2006.01)

(52) U.S. Cl.
CPC ............ *G06V 20/58* (2022.01); *G06V 20/597* (2022.01); *G06V 20/70* (2022.01); *G10L 15/083* (2013.01)

(58) Field of Classification Search
CPC ..... B60K 35/85; B60K 35/00; B60W 60/001; B60W 40/00; B60W 40/08; B60W 60/0015
See application file for complete search history.

(56) References Cited

U.S. PATENT DOCUMENTS

| | | | | |
|---|---|---|---|---|
| 11,298,835 | B2* | 4/2022 | Kim | ............... H01Q 9/42 |
| 11,327,483 | B2* | 5/2022 | al-Mohssen | ......... G05D 1/0231 |
| 11,327,503 | B2* | 5/2022 | Deyle | ............... G06V 20/58 |
| 11,331,805 | B2* | 5/2022 | Cappello | ............... A63F 13/90 |
| 2017/0225336 | A1* | 8/2017 | Deyle | ............... B25J 11/008 |
| 2019/0266414 | A1* | 8/2019 | Stawiszynski | ......... G06Q 50/26 |
| 2020/0012873 | A1 | 1/2020 | Kim | |
| 2021/0208949 | A1* | 7/2021 | Bijwe | ............... G06F 9/5005 |

OTHER PUBLICATIONS

Frankfurter Rundschau; "Autonomes Fahren—Brauchen wir überhaupt noch Fahrlehrer?"; https://www.fr.de/ratgeber/auto/brauchen-ueberhaupt-noch-fahrlehrer-11141969.html; retrieved on Mar. 11, 2021, 6 pages (including 3 pages english translation).

Stadt Wien; "Eingereichte Projekte zur Ausstellung Stadt fair teilen"; https://www.wien.gv.at/stadtentwicklung/alltagundfrauen/projekte.html; retrieved on Mar. 11, 2021, 8 pages (including 3 5 pages english translation).

George, Anjith et al., "Real-time Eye Gaze Direction Classification Using Convolutional Neural Network", IEEE, May 17, 2016, 5 pages, IEEE International Conference on Signal Processing and Communication, SPCOM 2016.

Köpüklü, Okan et al., "DriverMHG: A Multi-Modal Dataset for Dynamic Recognition of Driver Micro Hand Gestures and a Real-Time Recognition Framework", IEEE, Mar. 2, 2020, 8 pages, IEEE International Conference on Automatic Face and Gesture Recognition (FG 2020).

European Search Report issued for the corresponding European patent application No. 22 15 3868, dated Jul. 13, 2022 2 pages (for informational purposes only).

Raheja, J. L. et al., "Hand gesture pointing location detection", Elsevier, Feb. 2014, pp. 993-996, Optik—International Journal for Light and Electron Optics, vol. 125, Issue 3.

* cited by examiner

FIG. 13

Identifying within first data representing at least one of audio from within the vehicle or an image from within the vehicle, second data representing an audio indicator or an image indicator, wherein the audio indicator is human speech, and wherein the image indicator represents an action of a human within the vehicle 1302

Identifying within third data representing an image of a vicinity external to the vehicle, an object corresponding to at least one of the audio indicator or the video indicator 1304

Generating object data to classify the third data 1306

VEHICLE DATA RELATION DEVICE AND METHODS THEREFOR

TECHNICAL FIELD

Various aspects of the disclosure relate to speech recognition and speech-based object recognition from image data.

BACKGROUND

Autonomous vehicle and partially autonomous vehicles typically rely on a plurality of sensors to detect information about the vehicles' surroundings and make driving decisions based on this information. Such sensors may include, for example, a plurality of cameras, one or more Light Detection and Ranging (LIDAR) systems, one or more Radio Detection and Ranging (Radar) systems, microphones, accelerometers, and/or position sensors. As these sensors generate substantial quantities of data, autonomous vehicles may be required to parse through these large quantities of data for their diving operations.

One particular challenge in processing these data is the ability to discern between relevant sensor data and irrelevant sensor data. Artificial neural networks (ANNs) are increasingly used for processing sensor data and reaching driving decisions. Artificial neural networks may be particularly well-suited to this task, since they may be configured to receive and rapidly parse through large quantities of data.

Successful implementation of ANNs for such parsing of sensor data, however, requires substantial training. One particularly challenging task is to teach ANNs to distinguish between relevant sensor data and irrelevant sensor data. Otherwise stated, whereas human drivers may be able to distinguish with relative ease between relevant visual or auditory information, an ANN, without additional training, may be unable to do so.

BRIEF DESCRIPTION OF THE DRAWINGS

In the drawings, like reference characters generally refer to the same parts throughout the different views. The drawings are not necessarily to scale, emphasis instead generally being placed upon illustrating the exemplary principles of the disclosure. In the following description, various exemplary aspects of the disclosure are described with reference to the following drawings, in which:

FIG. 13 depicts a method of vehicle data relation.

DESCRIPTION

Figure 1:
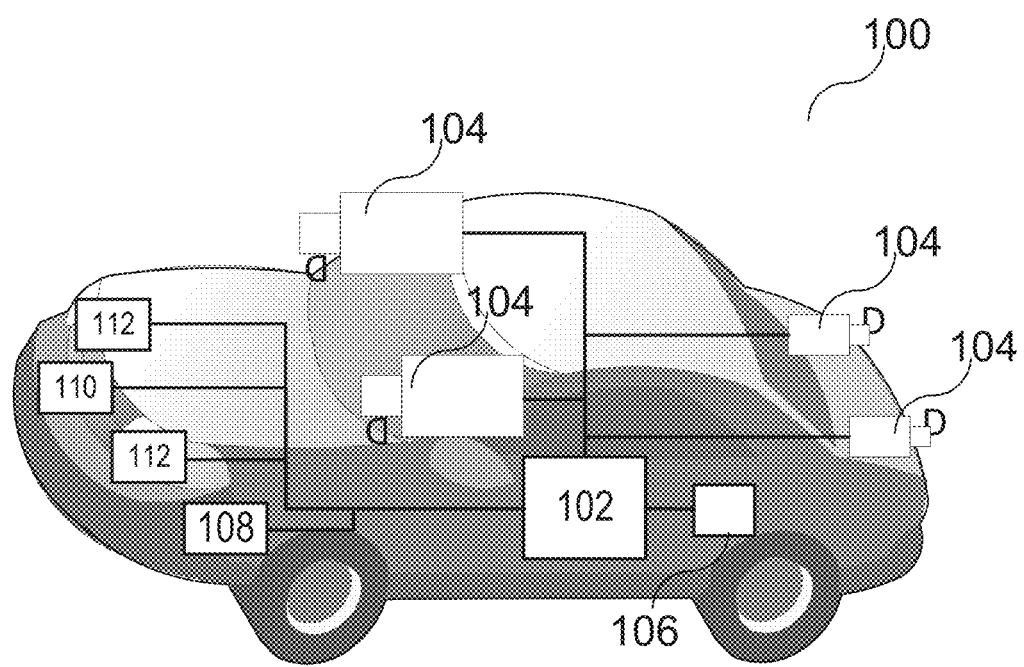
FIG. 1 shows an exemplary autonomous vehicle in accordance with various aspects of the present disclosure.

The following detailed description refers to the accompanying drawings that show, by way of illustration, exemplary details and aspects in which aspects of the present disclosure may be practiced.

The word "exemplary" is used herein to mean "serving as an example, instance, or illustration". Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc.).

The phrases "group (of)", "set (of)", "collection (of)", "series (of)", "sequence (of)", "grouping (of)", etc., in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

A "vehicle" may be understood to include any type of driven object. By way of example, a vehicle may be a driven object with a combustion engine, a reaction engine, an electrically driven object, a hybrid driven object, or a combination thereof. A vehicle may be or may include an automobile, a bus, a mini bus, a van, a truck, a mobile home, a vehicle trailer, a motorcycle, a bicycle, a tricycle, a train locomotive, a train wagon, a moving robot, a personal transporter, a boat, a ship, a submersible, a submarine, a drone, an aircraft, or a rocket, among others.

The term "autonomous vehicle" may describe a vehicle capable of implementing at least one navigational change without driver input. A navigational change may describe or include a change in one or more of steering, braking, or acceleration/deceleration of the vehicle. A vehicle may be described as autonomous even in case the vehicle is not fully automatic (for example, fully operational with driver or without driver input). Autonomous vehicles may include those vehicles that can operate under driver control during certain time periods and without driver control during other time periods. Autonomous vehicles may also include vehicles that control only some aspects of vehicle navigation, such as steering (e.g., to maintain a vehicle course between vehicle lane constraints) or some steering operations under certain circumstances (but not under all circumstances), but may leave other aspects of vehicle navigation to the driver (e.g., braking or braking under certain circumstances). Autonomous vehicles may also include vehicles that share the control of one or more aspects of vehicle navigation under certain circumstances (e.g., hands-on, such as responsive to a driver input) and vehicles that control one or more aspects of vehicle navigation under certain circumstances (e.g., hands-off, such as independent of driver input). Autonomous vehicles may also include vehicles that control one or more aspects of vehicle navigation under certain circumstances, such as under certain environmental conditions (e.g., spatial areas, roadway conditions). In some aspects, autonomous vehicles may handle some or all aspects of braking, speed control, velocity control, and/or steering of the vehicle. An autonomous vehicle may include those vehicles that can operate without a driver. The level of autonomy of a vehicle may be described or determined by the Society of Automotive Engineers (SAE) level of the vehicle (e.g., as defined by the SAE, for example in SAE J3016 2018: Taxonomy and definitions for terms related to driving automation systems for on road motor vehicles) or by other relevant professional organizations. The SAE level may have a value ranging from a minimum level, e.g. level 0 (illustratively, substantially no driving automation), to a maximum level, e.g. level 5 (illustratively, full driving automation).

In the context of the present disclosure, "vehicle operation data" may be understood to describe any type of feature related to the operation of a vehicle. By way of example, "vehicle operation data" may describe the status of the vehicle such as the type of tires of the vehicle, the type of vehicle, and/or the age of the manufacturing of the vehicle. More generally, "vehicle operation data" may describe or include static features or static vehicle operation data (illustratively, features or data not changing over time). As another example, additionally or alternatively, "vehicle operation data" may describe or include features changing during the operation of the vehicle, for example, environmental conditions, such as weather conditions or road conditions during the operation of the vehicle, fuel levels, fluid levels, operational parameters of the driving source of the vehicle, etc. More generally, "vehicle operation data" may describe or include varying features or varying vehicle operation data (illustratively, time-varying features or data).

Various aspects of the disclosure herein may utilize one or more machine-learning models to perform or control functions of the vehicle (or other functions described herein). The term "model" may, for example, used herein may be understood as any kind of algorithm, which provides output data from input data (e.g., any kind of algorithm generating or calculating output data from input data). A machine-learning model may be executed by a computing system to progressively improve performance of a specific task. In some aspects, parameters of a machine-learning model may be adjusted during a training phase based on training data. A trained machine-learning model may be used during an inference phase to make predictions or decisions based on input data. In some aspects, the trained machine-learning model may be used to generate additional training data. An additional machine-learning model may be adjusted during a second training phase based on the generated additional training data. A trained additional machine-learning model may be used during an inference phase to make predictions or decisions based on input data.

The machine-learning models described herein may take any suitable form or utilize any suitable technique (e.g., for training purposes). For example, any of the machine-learning models may utilize supervised learning, semi-supervised learning, unsupervised learning, or reinforcement learning techniques.

In supervised learning, the model may be built using a training set of data including both the inputs and the corresponding desired outputs (illustratively, each input may be associated with a desired or expected output for that input). Each training instance may include one or more inputs and a desired output. Training may include iterating through training instances and using an objective function to teach the model to predict the output for new inputs (illustratively, for inputs not included in the training set). In semi-supervised learning, a portion of the inputs in the training set may be missing the respective desired outputs (e.g., one or more inputs may not be associated with any desired or expected output).

In unsupervised learning, the model may be built from a training set of data including only inputs and no desired outputs. The unsupervised model may be used to find structure in the data (e.g., grouping or clustering of data points), illustratively, by discovering patterns in the data. Techniques that may be implemented in an unsupervised learning model may include, e.g., self-organizing maps, nearest-neighbor mapping, k-means clustering, and singular value decomposition.

Reinforcement learning models may include positive or negative feedback to improve accuracy. A reinforcement-learning model may attempt to maximize one or more objectives/rewards. Techniques that may be implemented in a reinforcement learning model may include, e.g., Q-learning, temporal difference (TD), and deep adversarial networks.

Various aspects described herein may utilize one or more classification models. In a classification model, the outputs may be restricted to a limited set of values (e.g., one or more classes). The classification model may output a class for an input set of one or more input values. An input set may include sensor data, such as image data, radar data, LIDAR data and the like. A classification model as described herein may, for example, classify certain driving conditions and/or environmental conditions, such as weather conditions, road conditions, and the like. References herein to classification models may contemplate a model that implements, e.g., any one or more of the following techniques: linear classifiers (e.g., logistic regression or naive Bayes classifier), support vector machines, decision trees, boosted trees, random forest, neural networks, or nearest neighbor.

Various aspects described herein may utilize one or more regression models. A regression model may output a numerical value from a continuous range based on an input set of one or more values (illustratively, starting from or using an input set of one or more values). References herein to regression models may contemplate a model that implements, e.g., any one or more of the following techniques (or other suitable techniques): linear regression, decision trees, random forest, or neural networks.

A machine-learning model described herein may be or may include an ANN. The ANN may be any kind of neural network, such as a convolutional neural network, an autoencoder network, a variational autoencoder network, a sparse autoencoder network, a recurrent neural network, a deconvolutional network, a generative adversarial network, a forward thinking neural network, a sum-product neural network, and the like. The ANN may include any number of layers. The training of the ANN (e.g., adapting the layers of the neural network) may use or may be based on any kind of training principle, such as backpropagation (e.g., using the backpropagation algorithm).

Throughout the present disclosure, the following terms will be used as synonyms: driving parameter set, driving model parameter set, safety layer parameter set, driver assistance, automated driving model parameter set, and/or the like (e.g., driving safety parameter set).

Furthermore, throughout the present disclosure, the following terms will be used as synonyms: driving parameter, driving model parameter, safety layer parameter, driver assistance and/or automated driving model parameter, and/or the like (e.g., driving safety parameter).

FIG. 1 shows an exemplary vehicle, namely vehicle 100, in accordance with various aspects of the present disclosure. In some aspects, vehicle 100 may include one or more processors 102, one or more image acquisition devices 104, one or more position sensors 106, one or more speed sensors 108, one or more radar sensors 110, and/or one or more LIDAR sensors 112.

In some aspects, vehicle 100 may include a safety system 200 (as described with respect to FIG. 2 below). It is appreciated that vehicle 100 and safety system 200 are exemplary in nature and may thus be simplified for explanatory purposes. Locations of elements and relational distances (as discussed above, the figures are not to scale) are provided as examples and are not limited thereto. The safety system 200 may include various components depending on the requirements of a particular implementation.

Figure 2:
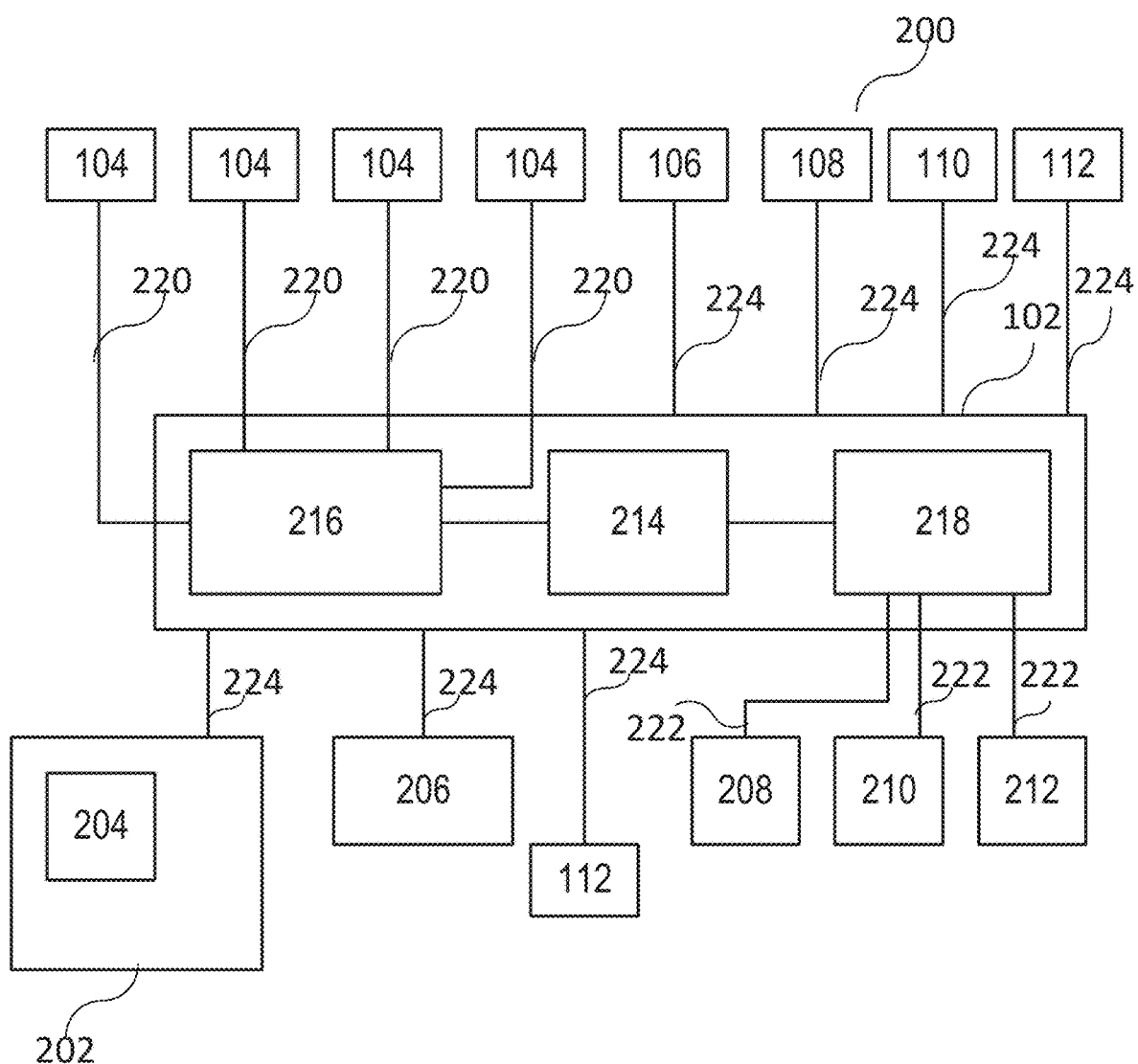
FIG. 2 shows various exemplary electronic components of a safety system of the vehicle in accordance with various aspects of the present disclosure.

FIG. 2 shows various exemplary electronic components of a vehicle, namely safety system 200, in accordance with various aspects of the present disclosure. In some aspects, the safety system 200 may include one or more processors 102, one or more image acquisition devices 104 (e.g., one or more cameras), one or more position sensors 106 (e.g., a Global Navigation Satellite System (GNSS), a Global Positioning System (GPS), among others) one or more speed sensors 108, one or more radar sensors 110, and/or one or more LIDAR sensors 112. According to at least one aspect, safety system 200 may further include one or more memories 202, one or more map databases 204, one or more user interfaces 206 (e.g., a display, a touch screen, a microphone, a loudspeaker, one or more buttons and/or switches, etc.), and/or one or more wireless transceivers 208, 210, 212. The wireless transceivers 208, 210, 212 may, in some aspects, be configured according to the same, different, or any combination thereof radio communication protocols or standards. By way of example, a wireless transceiver (e.g., a first wireless transceiver 208) may be configured in accordance with a Short Range mobile radio communication standard (e.g., Bluetooth, Zigbee, among others). As another example, a wireless transceiver (e.g., a second wireless transceiver 210) may be configured in accordance with a Medium or Wide Range mobile radio communication standard (e.g., 3G (e.g. Universal Mobile Telecommunications System—UMTS), 4G (e.g. Long Term Evolution—LTE), and/or 5G mobile radio communication standard in accordance with corresponding 3GPP ($3^{rd}$ Generation Partnership Project) standards, among others). As a further example, a wireless transceiver (e.g., a third wireless transceiver 212)

may be configured in accordance with a Wireless Local Area Network communication protocol or standard (e.g., IEEE 802.11, 802.11, 802.11a, 802.11b, 802.11g, 802.11n, 802.11p, 802.11-12, 802.11ac, 802.11ad, 802.11ah, among others). The one or more wireless transceivers 208, 210, 212 may be configured to transmit signals via the antenna system over an air interface.

In some aspects, the one or more processors 102 may include an application processor 214, an image processor 216, a communication processor 218, and/or any other suitable processing device. Image acquisition device(s) 104 may include any number of image acquisition devices and components depending on the requirements of a particular application. Image acquisition devices 104 may include one or more image capture devices (e.g., cameras, CCDs (charge coupling devices), or any other type of image sensor).

In at least one aspect, the safety system 200 may also include a data interface communicatively connecting the one or more processors 102 to the one or more image acquisition devices 104. For example, a first data interface may include any wired and/or wireless first link 220 or first links 220 configured to transmit image data acquired by the one or more image acquisition devices 104 to the one or more processors 102 (e.g., to the image processor 216).

The wireless transceivers 208, 210, 212 may, in some aspects, be coupled to the one or more processors 102 (e.g., to the communication processor 218) via, for example a second data interface. The second data interface may include any wired and/or wireless second link 222 or second links 222 configured to transmit radio transmitted data acquired by wireless transceivers 208, 210, 212 to the one or more processors 102, e.g., to the communication processor 218.

In some aspects, the memories 202 as well as the one or more user interfaces 206 may be coupled to each of the one or more processors 102, e.g., via a third data interface. The third data interface may include any wired and/or wireless third link 224 or third links 224. Furthermore, the position sensor 106 may be coupled to each of the one or more processors 102, e.g., via the third data interface.

Such transmissions may also include communications (e.g., one-way or two-way) between the vehicle 100 and one or more other (target) vehicles in an environment of the vehicle 100 (e.g., to facilitate coordination of navigation of the vehicle 100 in view of or together with other (target) vehicles in the environment of the vehicle 100), or even a broadcast transmission to unspecified recipients in a vicinity of the transmitting vehicle 100.

One or more of the transceivers 208, 210, 212 may be configured to implement one or more vehicle to everything (V2X) communication protocols, which may include vehicle to vehicle (V2V), vehicle to infrastructure (V2I), vehicle to network (V2N), vehicle to pedestrian (V2P), vehicle to device (V2D), vehicle to grid (V2G), and other protocols.

Each processor 214, 216, 218 of the one or more processors 102 may include various types of hardware-based processing devices. By way of example, each processor 214, 216, 218 may include a microprocessor, pre-processors (such as an image pre-processor), graphics processors, a central processing unit (CPU), support circuits, digital signal processors, integrated circuits, memory, or any other types of devices suitable for running applications and for image processing and analysis. In some aspects, each processor 214, 216, 218 may include any type of single or multi-core processor, mobile device microcontroller, central processing unit, etc. These processor types may each include multiple processing units with local memory and instruction sets. Such processors may include video inputs for receiving image data from multiple image sensors and may also include video out capabilities.

Any of the processors 214, 216, 218 disclosed herein may be configured to perform certain functions in accordance with program instructions, which may be stored in a memory of the one or more memories 202. In other words, a memory of the one or more memories 202 may store software that, when executed by a processor (e.g., by the one or more processors 102), controls the operation of the system, e.g., the safety system. A memory of the one or more memories 202 may store one or more databases and image processing software, as well as a trained system, such as a neural network, or a deep neural network, for example. The one or more memories 202 may include any number of random access memories, read only memories, flash memories, disk drives, optical storage, tape storage, removable storage, and other types of storage.

In some aspects, the safety system 200 may further include components such as a speed sensor 108 (e.g., a speedometer) for measuring a speed of the vehicle 100. The safety system may also include one or more accelerometers (either single axis or multiaxis) (not shown) for measuring accelerations of the vehicle 100 along one or more axes. The safety system 200 may further include additional sensors or different sensor types such as an ultrasonic sensor, a thermal sensor, one or more radar sensors 110, one or more LIDAR sensors 112 (which may be integrated in the head lamps of the vehicle 100), and the like. The radar sensors 110 and/or the LIDAR sensors 112 may be configured to provide pre-processed sensor data, such as radar target lists or LIDAR target lists. The third data interface may couple the speed sensor 108, the one or more radar sensors 110 and the one or more LIDAR sensors 112 to at least one of the one or more processors 102.

The one or more memories 202 may store data, e.g., in a database or in any different format, that, e.g., indicate a location of known landmarks. The one or more processors 102 may process sensory information (such as images, radar signals, depth information from LIDAR or stereo processing of two or more images) of the environment of the vehicle 100 together with position information, such as a GPS coordinate, a vehicle's ego-motion, etc., to determine a current location of the vehicle 100 relative to the known landmarks, and refine the determination of the vehicle's location. Certain aspects of this technology may be included in a localization technology such as a mapping and routing model.

The map database 204 may include any type of database storing (digital) map data for the vehicle 100, e.g., for the safety system 200. The map database 204 may include data relating to the position, in a reference coordinate system, of various items, including roads, water features, geographic features, businesses, points of interest, restaurants, gas stations, etc. The map database 204 may store not only the locations of such items, but also descriptors relating to those items, including, for example, names associated with any of the stored features. In such aspects, a processor of the one or more processors 102 may download information from the map database 204 over a wired or wireless data connection to a communication network (e.g., over a cellular network and/or the Internet, etc.). In some cases, the map database 204 may store a sparse data model including polynomial representations of certain road features (e.g., lane markings) or target trajectories for the vehicle 100. The map database 204 may also include stored representations of various recognized landmarks that may be provided to determine or update a known position of the vehicle 100 with respect to a target trajectory. The landmark representations may include data fields such as landmark type, landmark location, among other potential identifiers.

Furthermore, the safety system 200 may include a driving model, e.g., implemented in an advanced driving assistance system (ADAS) and/or a driving assistance and automated driving system. By way of example, the safety system 200 may include (e.g., as part of the driving model) a computer implementation of a formal model such as a safety driving model. A safety driving model may be or include a mathematical model formalizing an interpretation of applicable laws, standards, policies, etc. that are applicable to self-driving (ground) vehicles. A safety driving model may be designed to achieve, e.g., three goals: first, the interpretation of the law should be sound in the sense that it complies with how humans interpret the law; second, the interpretation should lead to a useful driving policy, meaning it will lead to an agile driving policy rather than an overly-defensive driving which inevitably would confuse other human drivers and will block traffic and in turn limit the scalability of system deployment; and third, the interpretation should be efficiently verifiable in the sense that it can be rigorously proven that the self-driving (autonomous) vehicle correctly implements the interpretation of the law. A safety driving model, illustratively, may be or include a mathematical model for safety assurance that enables identification and performance of proper responses to dangerous situations such that self-perpetrated accidents can be avoided.

As described above, the vehicle 100 may include the safety system 200 as also described with reference to FIG. 2.

The vehicle 100 may include the one or more processors 102 e.g. integrated with or separate from an engine control unit (ECU) of the vehicle 100.

The safety system 200 may in general generate data to control or assist to control the ECU and/or other components of the vehicle 100 to directly or indirectly control the driving of the vehicle 100.

One challenge in implementing an ANN for autonomous driving is training the ANN to distinguish between relevant and less relevant (e.g. irrelevant, less immediately relevant) sensor data. This can be analogized to a novice driver. Although the novice driver may have developed outstanding visual and auditory acuity and may be able to accurately perceive the vehicle's surroundings, the novice driver may struggle to distinguish more important information from less important information. Illustratively, the novice driver may attribute undue significance to an ambulance on the opposite side of a divided highway, or may fail to appreciate the significance of a small child on a bicycle several meters from the road. As the novice driver develops driving competency, the novice driver learns to spot dangers in sensory information and to attribute appropriate weight (e.g. significant or insignificant, relevant or irrelevant) to individual aspects of the sensor information.

ANNs must undergo similar training to allow them to discern between relevant and irrelevant information. That is, ANNs must be trained to receive sensor information (e.g. individual sensor data streams or multiple sensor data streams) and identify the aspects or portions of the sensor data that are of particular relevance for driving decisions. Conversely, ANNs may be configured to identify less relevant or irrelevant sensor data.

As described supra, an ANN's training may result in a modification of one or more weights associated with its nodes or layers and/or modification of one or more functions (e.g. one or more activation functions). As there are a variety of ANN types and implementations which may influence the details of ANN training, and given the skilled person is expected to understand the details of ANN training at the node and/or function level, the instant disclosure will predominately describe higher-level training functions in which one or more streams of sensor data are analyzed for relevance and cross-referenced. Using these techniques, and according to one aspect of the disclosure, the ANN can identify and label relevant sensor data for processing of driving decisions. According to another aspect of the disclosure, the ANN can utilize these techniques to discern relevant information from irrelevant information.

In known efforts to train an ANN, such as for evaluation of sensor data in an autonomous driving context, a vendor may collect hundreds or even thousands of hours of sensor data that show the actions of human drivers in connection with recorded data corresponding to a vicinity of the vehicle, such as data related to road boundaries and drivable surface, traffic signs, static objects, mobile objects, and location data. Using this data, the ANN may learn to match certain external sensor input with certain driver actions. In such conventional methods, it is difficult to teach specific dangers of certain situations to the ANN, since there is often noticeable reaction from the driver, or since no accident actually occurred. Otherwise stated, because an experienced human driver (e.g. a model driver for a training program) may avoid or prevent dangers throughout normal operation without any noticeable cues of the dangers being avoided or the steps taken to avoid the dangers, the ANN may be limited in its ability to learn from these situations. In contrast, a human instructor can utilize the instructor's experience to recognize and instruct regarding potential dangers. In some cases, the instructor may be able to comment on or instruct about potential dangers, even before a collision becomes imminent, or even likely. The ability to perceive driving instruction represents an efficient strategy to augment or replace existing methods to train ANNs for driving operation.

This disclosure describes, inter alia, strategies to capture input or instructions of human driving instructors, and to learn by cross-referencing this information with one or more additional sources of information, such as with the actions of a novice driver in the vehicle and/or additional sensor information, such that the ANN learns to label dangerous driving situations and/or to map these dangerous situations to examples of correct and incorrect behavior of human drivers. In this way, human driving behavior may be recorded together with a sensor-based environment model; moreover, potentially dangerous driving situations may be pointed out and the correct reaction to the perceived danger recorded. Since potential dangers may not materialize as actual dangers during vehicle operation, traditional approaches might not appreciate the significance of such potential dangers without explicit comment on them.

Driving instructors are experienced in recognizing and describing dangerous situations to novice drivers (e.g. their students). Novice drivers display both correct and incorrect behavior throughout their driving instruction and a principle task of a driving instructor is to comment on, or "label", the behavior. This exchange between teacher and student can be harvested to improve automated vehicles evaluation of dangerous situations (e.g. to train an ANN to better evaluate sensor data).

As described supra with respect to the analogy to the novice driver, driver's education programs (e.g. classes, instructional sessions, practical sessions, etc.) are often performed in the context of an instructor and a student together in a vehicle or a vehicle simulator, or to another vehicle in which a passenger provides instructions to a driver. Throughout this disclosure, the term "vehicle" is used in the context of driver's education; however, it is expressly stated that the term "vehicle" may also refer to a vehicle simulator. Typically, the student will operate the vehicle (e.g. sitting in the driver's seat), while the instructor provides driving input, such as verbal instructions, physical cues (e.g., gesturing, pointing, other body language), or in some cases, even physical manipulation of the steering wheel or the brakes. This driving input can be used to train an ANN. Otherwise stated, this driving input can be analyzed and cross-referenced to sensor data to distinguish between more relevant and less relevant sensor data.

Figure 3:
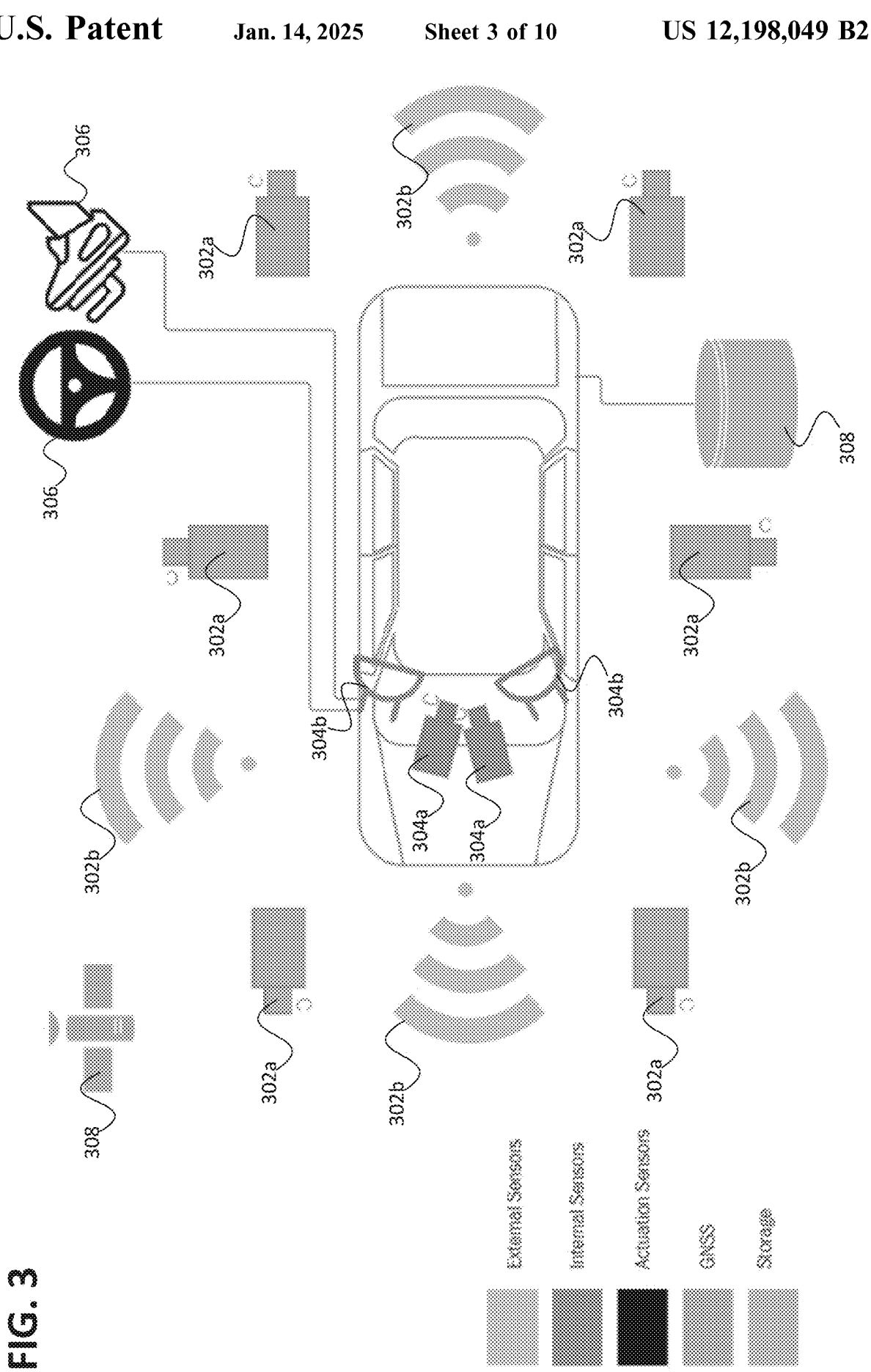
FIG. 3 depicts an exemplary vehicle configured with a plurality of sensors.

Autonomous vehicle, semi-autonomous vehicles (e.g., vehicles that perform one or more autonomous driving operations but cannot operate fully independently of human control on a sustained basis), and even predominately non-autonomous vehicles are frequently equipped with a plurality of sensors, which may detect information about areas interior or exterior to a vehicle (e.g. the inside of the vehicle, an external vicinity of the vehicle, etc.) and generate corresponding sensor data. The one or more sensors may be connected to (e.g. electrically conductively connected) to one or more processors or may be configured to wirelessly send sensor data to the one or more processors (e.g. via one or more transmitters and receivers). FIG. 3 depicts an exemplary vehicle configured with a plurality of sensors. In this figure, the vehicle includes a plurality of external sensors (e.g. outward facing sensors) that are configured to detect the environment within a vicinity of the vehicle including, but not limited to, drivable path, lane markings, static and mobile objects (e.g. other vehicles) and traffic signs. The sensors may be arranged to cover 360° around the vehicle such that both forward operation and reverse operation may be appreciated. Such sensor may include one or more image sensors (e.g. cameras, video cameras, depth cameras, etc.) 302a and one or more ranging sensors (e.g. Light Detection and Ranging (LIDAR), Radio Detection and Ranging (RADAR)) 302b. The external sensors may optionally include one or more microphones (not pictured), which may be configured to detect external and/or ambient noise.

The vehicle may be equipped with one or more inward facing visual sensors 304a, which may be configured to detect information within the inside of the vehicle. These may include one or more image sensors (e.g. mono or stereo cameras) and/or one or more novel sensors, such as event cameras, which may be capable of detecting eye gaze and/or gestures, such as from the driving instructor and/or the driver. The vehicle may also be equipped with one or more inward facing microphones 304b, which may be configured to record speech within the vehicle, such as by the driving instructor and/or the driver. The vehicle may be equipped with vehicle actuation sensors 306, which may be configured to detect speed, acceleration, steering, and/or breaking. The vehicle may include one or more position sensors 308 (e.g. one or more Global Navigation Satellite Systems (GNSS) sensors), which may be configured to detect position, location, and/or heading data. The vehicle may include a data storage system 308 (e.g. memory, hard drives, solid-state drives, optical drives, etc.), on which some or all of the above sensor data may be stored (e.g. for the duration of a driving lesson, for a predetermined duration, indefinitely, etc.). The vehicle may include one or more time-keepers (e.g. clocks, processor clocks, GNSS time-keeping devices, etc.) (not pictured), which may permit the device to create synchronized time stamps between all sensor data streams. Such synchronization may be useful or even necessary for subsequent comparison of data streams. The vehicle may include a high bandwidth data connection, via which the vehicle may upload the collected sensor data to an exterior device (e.g. a server, a data repository, etc.). Alternatively or additionally, the vehicle may include one or more data transferors (not pictured), which may include one or more busses, one or more ports, one or more data transfer cables, etc. Such uploading of sensor data may occur continuously or after the training run.

The vehicle may include one or more processors and one or more non-transitory computer readable media including instructions which, if executed, cause the one or more processors to interpret any of the gaze, gestures and speech of the driver and/or driving instructor and to create labels from which dangerous situations can be associated with external sensor data. These instructions may include one or more machine-learning algorithms for external and internal scene interpretation.

In some cases, although such data related to the student (novice driver) may be useful, data related to the gaze, gestures, speech, or any of these, of the driving instructor may be more useful, or more consistently useful, than such data related to the student. In some cases, the student's reactions and related steering, acceleration and/or breaking data may be useful in the data referencing and/or label generation as described herein. When the vehicle includes the one or more processors and the non-transitory computer readable medium as described herein, the sensor data referencing and label generation functionalities as described herein may be performed within the vehicle. Alternatively or additionally, these functionalities may be performed externally to the vehicle (e.g. in a device to which the relevant data are uploaded, whether simultaneously/concurrently to the driving instruction or subsequent to the driving instruction). For example, a central storage and processing facility may exist, such as for vehicles of all participating driving instruction schools. In this case, all related/eligible vehicles may upload their data to the central storage and processing facility.

The sensor data referencing and label generation may be performed either in real time with the vehicle operation (e.g. online) or following vehicle operation (e.g. offline). Whether online or offline, the configuration may be selected based on a desired implementation. Since the sensor data referencing and label generation are performed from sensor data, which can be recorded in its entirety, it is not expected that any loss in the quality of analysis will occur from an offline configuration.

Figure 4:
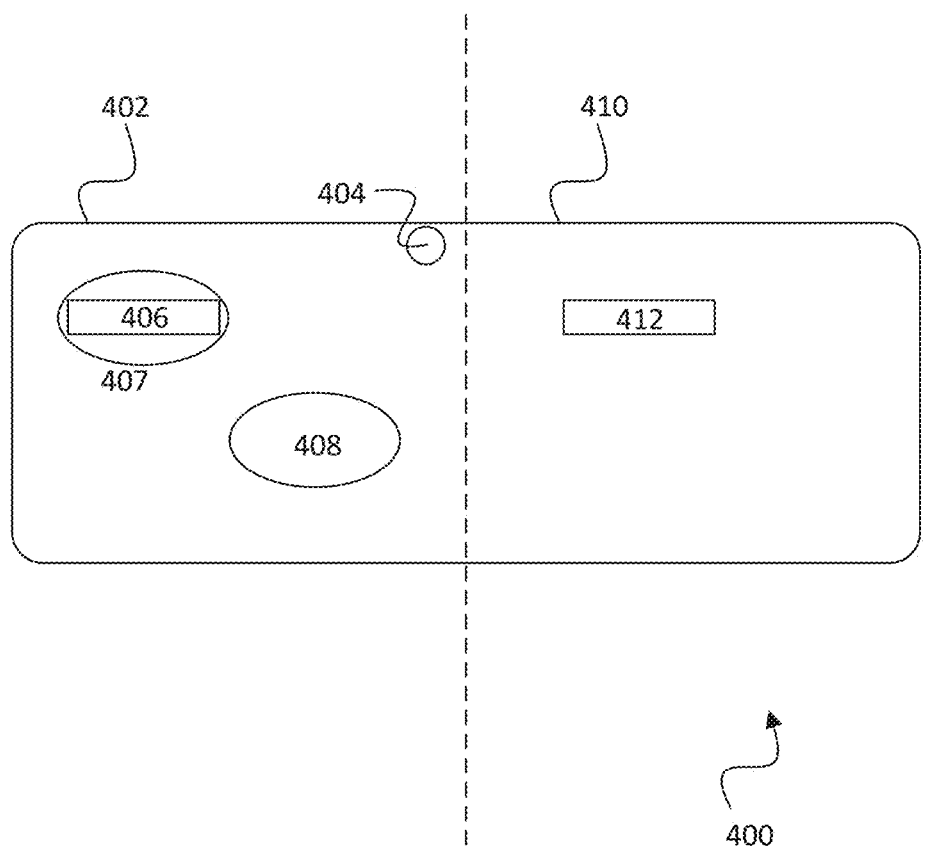
FIG. 4 depicts a vehicle interior 400 according to an aspect of the disclosure.

The device may label external sensor data based on input from the vehicle's interior. FIG. 4 depicts an interior (e.g. a stylized view of the interior through the windshield) 400 according to an aspect of the disclosure. In this figure, the windshield is depicted as including an instructor portion 402 (e.g. generally corresponding to the passenger's seat) and a driver portion 410 (generally corresponding to the driver's seat). As described supra, the interior may include one or more microphones 404, which may be configured to detect and record speech or human sounds (e.g. non-speech utterances) within the vehicle's interior. The vehicle may also include one or more cameras (not pictured), which may be configured to detect information and generate corresponding image data for the interior of the vehicle. Although any aspect of the vehicle's interior may be utilized for the principles and methods disclosed herein, one or more processors may be configured to detect within the image data certain markers that may provide relevant information. These markers may include a gaze of the instructor 406, a facial expression of the instructor 407, a gesture of the instructor 408 (e.g. a hand gesture), a gaze of the novice driver 412, or any of these.

According to one aspect of the disclosure, one or more processors may label external sensor data based on one or more comments of the driving instructor. Human speech can communicate different degrees of information content. Thus, to process and understand human speech relevant to sensor data, it may first be useful to analyze the human speech for its type(s) of content. Such types of content may include, for example:

- a location of the danger (e.g. "front right");
- Identification of object(s) involved in the danger (e.g. "a group of elderly ladies");
- a statement of possible consequences (e.g. "they could step on the road without looking");
- a statement of correct action (e.g. "watch", "be ready to break", "slow down", "swerve right", "honk your horn", etc.);
- or any of these.

According to an aspect of the disclosure, the one or more processors may be configured to label irrelevance of an object based at least upon human speech. To make use of human speech (e.g. to identify a danger or relevance based on human speech), the one or more processors may be configured to recognize patterns or keywords within the human speech. In the following, a description of keyword analysis for labeling of relevant objects is described.

The one or more processors may be configured to utilize speech data as the primary mode to trigger attribution of increased relevance to sensor data. The one or more processors may utilize object distribution keywords to classify a specific object or group of objects relative to the human speech. The one or more processors may be configured to apply object detection algorithms in parallel to the external sensor input (e.g. using an object detection net analysis). For example, if the speech recognition class is a bicycle, all bicycles in the image sensor data are marked (e.g. labeled) as being dangerous or as potentially being dangerous. If several objects of the same type are detected (e.g., if more than one bicycle is present within the image sensor data), the one or more processors may be configured to rank the multiple objects by relevance. The relevance may be determined based on any desired factors. According to one aspect of the disclosure, the one or more processors may be configured to rank the multiple objects corresponding to the same keyword in terms of relevance based on their distance from the ego vehicle.

The received human speech may be thought of as including a plurality of keywords, each keyword potentially providing information about the location or relevance of a danger or object. Although the keyword structures may be implemented in a variety of fashions, the following describes an exemplary keyword implementation. In this implementation, the keywords may be defined by categories as follows:

a) Alerting keywords. Alerting keywords may include any keywords that suggest a heightened need for alertness or the possibility of imminent danger. Such keywords may include, but are not limited to, "attention", "watch out", "careful", "look", or "beware". Alternatively or additionally, such alerting keywords may not correspond exactly with a word, per se, but rather to an utterance associated with a need for alertness or the possibility of imminent danger, such as "ack", "woah", "uhh", or the like.

b) Direction keywords. Direction keywords may include any keywords that suggest a direction, such as a direction relative to the speaker, a direction relative to the driver, a direction relative to the vehicle, or otherwise. Such direction keywords may include, but are not limited to "in front", "to the left", "to the right", "on the left", "on the right", "up", "down", "behind", or otherwise.

c) Qualitative location keywords. Qualitative location keywords may include any keywords that suggest a location relative to a reference point. The reference point may be anything without limitation, and may include, but not be limited to, persons, roadways, buildings, vehicles, animals, and other objects. Examples of qualitative location keywords may include, but not be limited to, "at the next intersection", "behind the bus stop", "on the sidewalk", "by the white car", "above the roadway", "below the bridge", "in front of the dumpster", "beside the sign", or otherwise.

d) Object description keywords. Object description keywords may include any keywords that describe one or more objects. In this case, objects may include animate objects, inanimate objects, animals, people, or any combination thereof. Object description keywords may be used relative to an object posing a risk to the driver or vehicle. Object description keywords may include, but are not limited to, "a group of children", "two bicycles", "a trailer", "the elderly woman", "the cyclist", "the jogger", etc.

e) Action keywords. Action keywords may include any keywords that suggest an instruction for an action to be performed by the driver or vehicle. In the context of driving instruction, a driving instructor may be required to provide instructions in the form of commands relative to perceived dangers. The action keywords may be closely associated with instructions such that the presence of one or more action keywords may permit the underlying system to identify an instruction and relate the instruction to a driving command. Examples of action keywords include, but are not limited to, "slower", "faster", "stop", "pull over", "pass quickly", "overtake quickly", "veer", "swerve", "brake", "signal", etc.

Keyword recognition in human speech requires at least a functional level of speech recognition. That is, one or more processors must analyze microphone data representing human speech, and from this human speech, the one or more processors must identify words, phrases, sentences, or any of these. As computerized speech recognition is known, it will not be described in detail herein. Rather, it is assumed that the skilled person will understand how to implement one or more speech recognition programs to detect human speech within audio data. Such speech recognition programs are typically configured to receive an audio file and to output text corresponding to the recognized human speech. For the above description related to keywords, it is assumed that such recognized is available in text for, or in any other suitable form for keyword recognition.

According to an aspect of the disclosure, the device may be programmed to perform an inference phase, during which human interaction is detected. For the inference phase, voice recognition may be the primary mode in the machine-learning tool chain. A new alert label may be started (e.g. generated, implemented, executed) when recognizing an alerting keyword. This keyword may then be associated with external sensor data. External sensor data contemporaneous with the alert keyword may be deemed most relevant.

Alternatively or additionally, the external sensor data slightly before the alert keyword may be particularly relevant. This is best explained by the fact that a driving instructor's cognitive processes require time to appreciate a situation (e.g. an object, and danger, etc.) external to the vehicle, and then to formulate and express a verbal statement or response relative to the appreciated situation. As such, any spoken word may be attributable to sensor data occurring immediately before the word. Alternatively, because of relative permanence of objects and of certain dangerous situations, a danger appreciated momentarily before speaking a keyword about the danger is likely to continue to exist when the keyword is spoken. As such, the one or more processors may be configured to attribute relevance to portions of sensor data contemporaneous with a spoken keyword.

Depending on the richness of information contained in the instructor's instructions, it may be possible to map either an entire scene recorded by the sensors to the instruction, or rather to map only a certain area or certain objects to the instruction for labeling.

That is, having identified objects related to the keyword, the one or more processors may be configured to further limit the focus area within the external sensor data (e.g. image sensor data, RADAR, LIDAR, etc.) by applying qualitative keyword locations. More specifically, the speaker may utter a qualitative keyword location that corresponds to a particular object within a group of objects. More concretely, and continuing with the hypothetical bicycle example, the instructor may utter, "watch out! Bicycle. By the sign." In this manner, "watch out" is an attention keyword, which will cause the one or more processors to label incoming sensor data as being of heightened relevance for predetermined duration. The keyword "bicycle" describes an object within the sensor data, and the one or more processors may be configured to locate one or more bicycles within the sensor data. For example, a front facing camera may deliver sensor data representing a vicinity of the vehicle in which three bicycles are present. The one or more processors may be configured to label each of the three bicycles as being of particular relevance. Next, the keyword "by the sign" describes a location of the most relevant bicycle. In this manner, the one or more processors may be configured to locate a sign and to determine a proximity between the sign and the various bicycles. The bicycle that is closest to the sign may be identified as the bicycle by the sign that the driver is to watch out for. The one or more processors may be configured to label this bicycle as being of greater importance than the other identified bicycles.

Figure 5:
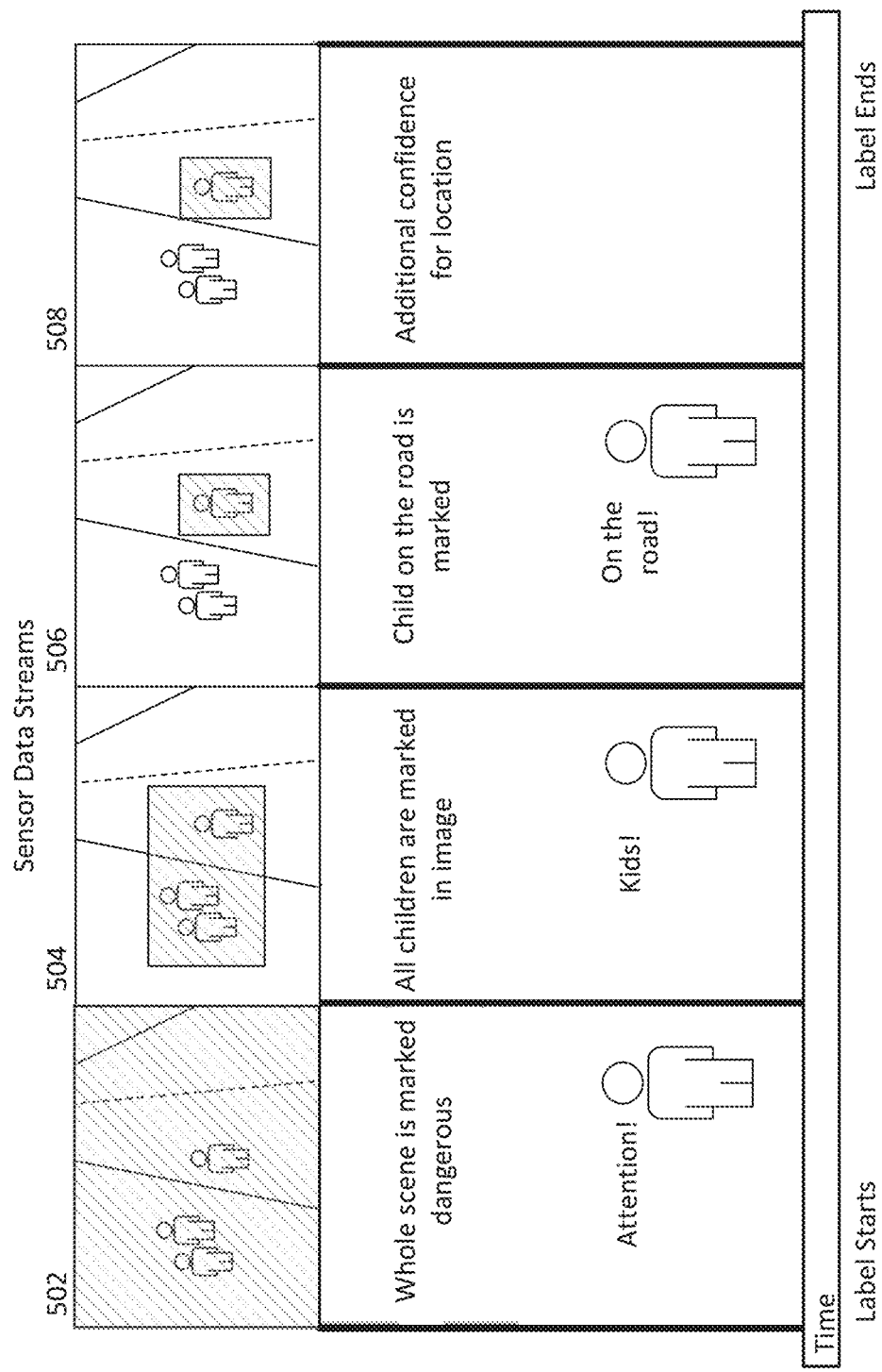
FIG. 5 depicts an object labeling algorithm based on human speech.

FIG. 5 depicts an object-labeling algorithm based on human speech. In this figure, four scenes of a road and three children are depicted as 502, 504, 506, and 508. These scenes are depicted in chronological order and indicate a chronology of object identification based on human speech. In the first scene 502, the instructor utilizes the alerting keyword, "attention." As stated above, this alerting keyword may indicate that one or more objects in the field of vision create a need for additional caution. Because no identifying information about the source of the danger has been provided, the one or more processors may label the entire field of vision as being especially relevant. This is depicted by the fully shaded view of 502. That is, the one or more processors may label all image data contemporaneous or essentially contemporaneous to the alerting keyword as being of heightened relevance. The one or more processors may be configured to derive additional keywords from subsequent human speech to further identify the danger.

In the next scene 504, the instructor follows up with an object description keyword, "kids." The one or more processors may be configured to recognize this keyword and to search the image data having already been marked as of heightened relevance for objects associated with the keyword "kids." The one or more processors may utilize any known object detection algorithm for this purpose. Upon detecting the one or more "kids" in the image sensor data, the one or more processors may be configured to restrict the region of heightened relevance to a region generally corresponding with the "kids." In this manner, the one or more processors are able to label a smaller area as being of heightened relevance, thereby allowing further distinction between relevant material and irrelevant material.

In the next scene 506, the instructor utilizes the qualitative location keyword, "on the road." Assuming that this qualitative location keyword is spoken in a close temporal relationship to the alerting keyword, the one or more processors may be configured to further narrow the region of heightened relevance to a region with a child on the road. This, of course, requires the additional context of "Road" and determining where the road is located, as well as the context of "on". By utilizing the context phrases "on" and "on the road", the one or more processors may search for one of the identified children who is currently on the road. In this case, only one child is currently on the road, and therefore the one or more processors may restrict the area of increased relevance to an area surrounding the singular child on the road.

In the next scene 508, additional confidence for the determined region of heightened relevance may be provided. The determinations made within scenes 502, 504, and 506 may be determined relative to a level of confidence. That is, one or more additional verbal keywords or gestures may be utilized to increase or decrease a level of confidence for the location that was depicted in 506.

Although the scenes in FIG. 5 are depicted as being implemented in the order of alerting keywords, object description keywords, and qualitative location keywords, it is specifically stated that any category or order of alerting keywords, direction keywords, qualitative location keywords object description keywords, action keywords, or any of these may be utilized in a procedure similar to that depicted in FIG. 5. That is, FIG. 5 is an exemplary depiction of keyword usage to identify a relevant object; however, the keywords and/or the order of keywords may vary relative to those in FIG. 5. The order of keywords may largely depend on the order of words in the instructor's speech and therefore the underlying system should ideally be able to process keywords in various orders.

Alternatively or additionally, the one or more processors may be configured to identify objects using eye gaze of the instructor or passenger, and/or one or more detected human gestures. Because an instructor is likely to provide a verbal or auditory instruction, eye gaze and human gestures may primarily function as a supplement to verbal instructions, such that the one or more processors can further refine object identification based on eye gaze or human gestures, or can improve a confidence level of object identification based on eye gaze or human gestures. That notwithstanding, it is also conceivable that instructor may provide human gestures to identify a danger, without also providing a verbal or auditory instruction. Accordingly, it is explicitly stated that the principles and methods disclosed herein with respect to object identification and/or confidence determination using eye gaze and human gestures may be used either in conjunction with or independently from speech instructions.

According to an aspect of the disclosure, the one or more processors may be configured to recognize gaze direction. That is, one or more processors may be configured to determine a direction of a human gaze (e.g. focus of attention, direction of eyes) from image sensor data. An underlying assumption that permits gaze detection is that people often look at the object they are discussing. In light of this assumption, the one or more processors may determine the direction of the human gaze and associate this direction with an object in a vicinity of the vehicle. Once said object is determined, it may be further possible to associate contemporaneously spoken text for keywords with the object. For example, an instructor seeing a cyclist traveling toward the vehicle's path of travel might gaze in the direction of the cyclist while speaking aloud one or more keywords, such as "watch out!" By detecting the instructor's gaze, the direction of gaze may be associated with the cyclist, and then the alerting keywords "watch out" can cause the one or more processors to associate a higher level of importance or relevance to the cyclist.

During recognition of gaze direction, the one or more processors may be configured to determine a direction of a human gaze (e.g. focus of attention, direction of eyes) from image sensor data. An underlying assumption that permits gaze detection is that people often look at the object they are discussing. In light of this assumption, the one or more processors may determine the direction of the human gaze and associate this direction with an object in a vicinity of the vehicle. Once said object is determined, it may be further possible to associate contemporaneously spoken text or keywords with the object. For example, an instructor seeing a cyclist traveling toward the vehicle's path of travel might gaze in the direction of the cyclist while speaking aloud one or more keywords, such as "watch out!" By detecting the instructor's gaze, the direction of gaze may be associated with the cyclist, and then the alerting keywords "watch out" can cause the one or more processors to associate a higher level of importance or relevance to the cyclist.

According to another aspect of the disclosure, labeling of data based on human speech may be supported by gaze (e.g. in which direction is the instructor looking; what external object corresponds to the gaze) and/or gestures (e.g., the instructor pointing in certain direction). The novice driver's reaction may be optionally recorded and mapped to the instructor's comments, said mapping occurring for a limited (e.g. predetermined) time following the comments, since such reactions' relevance is in most circumstances proximately related to the stimulus (e.g., the reactions may be more relevant when they closely temporally follow the stimulus (instruction), but their relevance diminishes with temporal removal from the stimulus).

Eye gaze direction estimation is important for many human machine interaction applications. Knowledge of gaze direction gives information about users' focus of attention. For a real-time framework for the classification of eye gaze direction, initially, the one or more processors may be configured to implement a facial detector. This facial detector may be any known system for facial detection. According to one aspect of the disclosure, the facial detector may include the Viola-Jones algorithm, which is a known framework for object detection that has been successfully implemented for facial detection.

Figure 6:
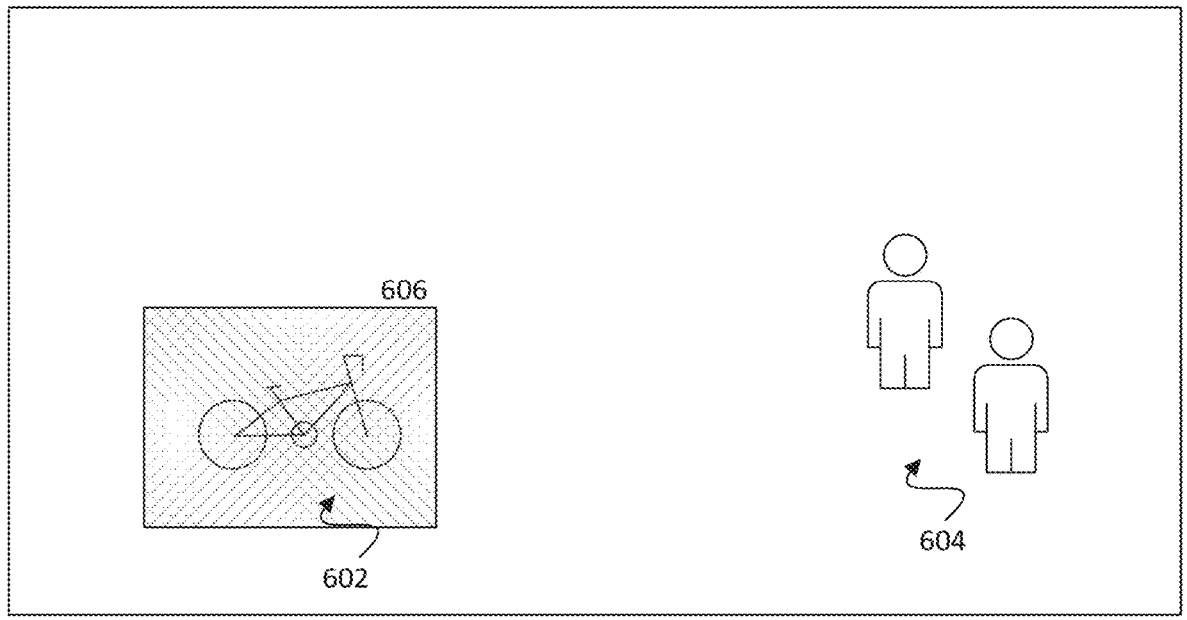
FIG. 6 depicts an example of gaze being used to identify an object.

FIG. 6 depicts an example of gaze being used to identify an object. In this image, the vicinity of the ego vehicle includes a bicycle 602 and two pedestrians 604. Without further information, it may not be immediately clear which of the bicycle 602 or the pedestrians 604 pose a danger to the ego vehicle or otherwise of heightened relevance to the ego vehicle. In this example, the instructor provides a verbal statement, "watch out!", and stares at the bicycle. The one or more processors may be configured to interpret the instructor's speech to detect the words "watch out!" With only the keyword "watch out!", it is apparent that something in the vehicle's vicinity requires a raised alertness; however, it is not immediately apparent what the object is (e.g. whether the bicycle or the pedestrians). If the instructor gazes at the bicycle while stating "watch out!", however, the one or more processors may link the instructor's gaze to the bicycle and therefore narrow the area of relevance 606 to an area around the bicycle, rather than considering the entire vicinity as being particular irrelevant. Similarly, if the instructor shouted, "watch out!", while pointing or otherwise gesturing to the bicycle, the one or more processors may link the pointing or gesture to the bicycle and therefore narrow the area of relevance 606 to an area around the bicycle.

Alternatively or additionally, the one or more processors may be configured to utilize one or more direction keywords together with gaze and/or hand gestures to further increase trust in the identified object in location. Here, the gaze direction may be of particular importance. The one or more processors may utilize gaze direction to identify an object of particular importance within the sensor data and/or to identify an object having particular importance, when the object is an object within a plurality of objects. Continuing with the bicycle example, in assuming that the one or more processors detect three bicycles within the sensor data, the instructor is likely to be gazing at the bicycle deemed to be of particular relevance or risk. The one or more processors may be configured to determine a gaze direction and associate that gaze direction with external sensor data, such that it can be determined that the instructor is gazing at a particular bicycle. In this manner, the bicycle being gazed at may be labeled as being of greater importance than the other identified bicycles.

After applying facial detection (e.g., after a face has been detected), the one or more processors may be configured to perform a rough eye region detection on the detected face. The eye region detection may utilize any known eye region detection algorithm or procedure. Known procedures for eye region detection may rely upon geometric relations and facial landmarks to locate and identify eyes. Once the eye region is detected, the one or more processors may be configured to classify the eye gaze direction. The one or more processors may be configured to implement a convolutional neural network (CNN) for eye gaze detection. In this manner, the one or more processors may determine a direction of eye gaze.

The direction of eye gaze may be dependent on a direction of both the instructor's eyes. According to an aspect of the disclosure, the CNN may be configured to determine a gaze direction of each eye independently (e.g. such as determining a direction of the left eye followed by determining a direction of the right eye). Using these determine directions, the one or more processors may calculate a fusion score to classify an eye gaze. That is, the one or more processors may be configured to determine an average or midpoint of the two determined eye gaze directions such that the determined direction of the left eye and the determined direction of the right eye may be harmonized. This harmonized or fused directional score may be classified as the eye gaze.

There are several available datasets for eye gaze classification. For example, Eye Chimera is a known database that permits eye gaze detection. According to an aspect of the disclosure, the one or more processors and/or the CNN may utilize Eye Chimera to detect an eye gaze of the instructor or other person inside the vehicle.

Figure 7:
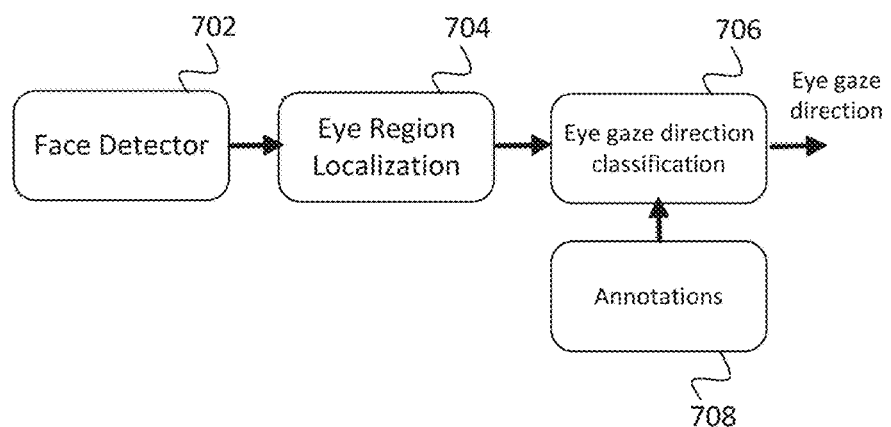
FIG. 7 depicts an eye gaze detector, according to an aspect of the disclosure.

FIG. 7 depicts an eye gaze detector, according to an aspect of the disclosure. The eye gaze detector may include a face detector 702, and eye region localizer 704, and an eye gaze direction classifier 706. These components may be implemented as a single component (e.g. in a processor, in a group of processors, on an integrated circuit, on a system on chip, etc.) or may be implemented in a plurality of components. These components may be implemented as software to be performed by one or more processors. These components may be implemented as an ANN. The face detector 702 may receive image sensor data of an interior of the vehicle and may perform one or more face detection algorithms on the image sensor data. The specific face detection algorithm employed may be selected for the given implementation. According to an aspect of the disclosure, the Viola Jones algorithm may be used, although implementation is not limited to use of the Viola Jones Algorithm. The face detector 702 may output a label or other identifier of a portion of an image corresponding to the image sensor data in which a face has been detected. The eye region localizer 704 may receive the image sensor data, the image sensor data corresponding to the detected face, and identifier corresponding to the area of the detected face, or any of these, and may perform an eye region localization on data corresponding to an area of the detected face. During the eye region localization, the eye region localizer 704 may implement one or more algorithms to determine the presence of eyes within an area corresponding to the detected face. The eye region localizer 704 may implement any known eye region-localizing algorithm to localize the eyes. These may include, but are not limited to, shape-based models (e.g., such as algorithms to detect eyes based on a semi-elliptical head model or algorithms to localize eye regions based on generalized head transforms); feature-based shape methods; appearance-based methods; or any combination thereof. Upon localizing the eye region, the eye region localizer 704 may output an identifier of a location within an image represented by the sensor data corresponding to the eye region. The gaze direction classifier 706 may receive this identifier and determine a gaze direction. Various strategies for determining gaze direction from image data are known, and a suitable gaze direction procedure may be selected for the given implementation. In some circumstances, gaze may be determined from eye position alone. In other circumstances, gaze may be determined from eye position relative to head position. In other circumstances gaze may be determined from eye position relative to a fixed reference point, such as a portion in the interior of the vehicle. The eye gaze direction classifier 706 may output a gaze direction identifier, which may represent a direction of gaze. The identifier a facial feature, a body part, a portion or axis of the head, a reference point within the vehicle, a reference point outside the vehicle, or otherwise.

According to an aspect of the disclosure, the gaze detector may be implemented within an ANN (including but not limited to a CNN). ANNs may be particularly well-suited for rapid evaluation of image sensor data to determine gaze direction. An ANN may be trained to detect gaze direction using annotated data 708. As a general principle, it may be assumed that the instructor is gazing at an object that is the subject of the instructor's keywords. As such, when a keyword is detected and when one or more keywords are utilized to identify an object of heightened relevance as described herein, annotated data identifying the object of heightened relevance (e.g. its location, its type or identity, or otherwise) may be sent to the gaze direction classifier 706. Using this annotated data, the gaze direction classifier 706 may compare a location of an object in a vicinity of the vehicle with a detected gaze direction. By mapping the gaze direction to the external image sensor data, the gaze detector may determine an accuracy of the gaze direction classification. That is, assuming that the object described by the keywords is the subject of the instructor's gaze, the gaze direction should correspond to the location of the detected object. Any difference between the gaze direction and the location of the object may be utilized in a training phase to improve the results of the gaze detector.

It is notable that gaze direction may include direct line of sight gaze direction and/or mirror gaze direction. In line of sight gaze direction, the vehicle may determine from interior-vehicle sensor data (e.g. camera data or otherwise) a direction of the instructor's gaze. The one or more processors also have sensor data corresponding to an external vicinity of the vehicle (image sensor data, LIDAR, RADAR, etc.). The one or more processors may determine a gaze direction of the speaker, such as a gaze direction relative to the speaker, a gaze direction relative to the vehicle, a gaze direction relative to a fixed point within the vehicle, or otherwise. The internal sensor data (e.g. internal microphone, internal camera) and the external sensor data (e.g. image sensor data, LIDAR, RADAR) may each be timestamped, which then allows for comparison of internal sensor data with contemporaneous external sensor data. When a gaze direction is detected, the one or more processors may be configured to analyze contemporaneous external sensor data (e.g. external data having a same, similar, contemporaneous, or overlapping timestamp with the detected gaze direction) and to tag or label as being of higher relevance objects in the sensor data corresponding to the gaze.

Figure 8:
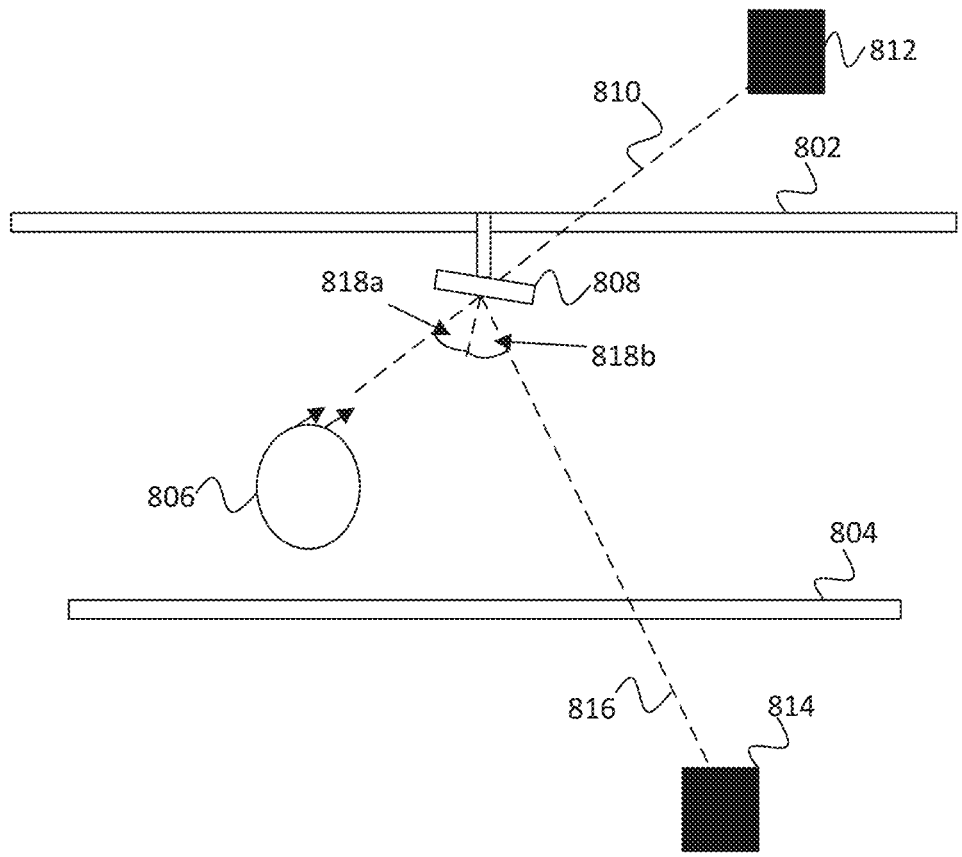
FIG. 8 shows a calculation of mirror gaze according to an aspect of the disclosure.

The one or more processors may be configured to distinguish between a line-of-sight gaze at an object and a gaze into a mirror (referred to herein as a "mirror gaze"). FIG. 8 shows a calculation of mirror gaze according to an aspect of the disclosure. In this figure, a representation of a vehicle having a front windshield 802 and a rear windshield 804 is depicted. A driver or passenger 806 is within the vehicle and is depicted as gazing toward a rearview mirror 808. Were the gaze detector and/or one or more processors to simply detect a direction (e.g. an angle) of gaze and associate that direction with an object external to the vehicle, the gaze detector and/or the one or more processors may overlook the rearview mirror 808 and instead view the gaze as continuing in a straight path beyond the front windshield 802, as depicted by 810. If an object is located along this path, as shown by 812, the gaze detector and/or the one or more processors may erroneously associate the gaze of the driver or passenger 806 with the object 812. Instead, it is necessary for the gaze detector and/or the one or more processors to consider the presence of the rearview mirror 808 and its effect on the gaze of the driver or passenger 806. Specifically, the driver or passenger 806 is viewing a reflection of obstacle 814 along a reflective path 816.

To achieve this, one or more processors may be configured to determine whether a driver or passenger is gazing toward a mirror (e.g. a review mirror or other mirror) and determine an angle of reflection. The law of reflection states that the angle of reflection equalizes the angle of incidence, or:

$$\theta_i = \theta_r \tag{1}$$

wherein $\theta_i$ is the angle of incidence 818a relative to an axis normal to the mirror's surface and $\theta_r$ is the angle of reflection 818b relative to the axis normal to the mirror's surface. That is, one or more processors may be configured to determine an angle or position of the mirror and an angle of incidence relative to the normal axis of the mirror, and from this calculation determine the angle of reflection. Once the angle of reflection is determined, the angle of reflection can be matched to external sensor data to determine an object that the instructor or passenger is gazing at. For example, should the instructor or passenger be looking in the rearview mirror, the one or more processors may determine the angle of reflection corresponding to a view toward the rear of the vehicle, and using this angle of reflection, the one or more processors may match the passenger or instructor's gaze to an object behind the vehicle. Although this is described exemplarily with respect to the rear view mirror, these principles may be applied to any other mirror, including, but not limited to, one or more side mirrors.

As stated above, and according to another aspect of the disclosure, the one or more processors may be configured to recognize one or more human gestures, such as in image sensor data (e.g., data from a camera turned inward on the driver and/or passenger). Such human gestures may include at least the following:

a) Pointing in a certain direction. Instructors may deliver instructions while pointing in a particular direction. Often such pointing is performed in connection with a verbal reference. That is, an instructor may name the object (e.g. such as with an object description keyword) and point to the object. Pointing to the object may be performed in conjunction with a statement about the location of the object (such as with a direction keyword or a qualitative location keyword), in which case the pointing serves to reinforce identification of the object through the verbal command or otherwise simplify identification of the object. Alternatively, the pointing may be performed in lieu of a statement about the location of the object, such as merely pointing to the object and naming it (e.g. "cyclist").

b) Attention sign (e.g. raised index finger). Certain gestures may be associated with a heightened need for attention. These gestures may be culturally specific, and therefore no particular gesture may be universal. Rather, the specific gesture or gestures associated with attention may be selected to meet the needs of a particular implementation. For example, in some countries, a raised index finger, without any additional verbal or nonverbal communication, may indicate a heightened need for attention.

c) Negating signs. Certain gestures may be associated with negation, which may suggest that a current course of action is incorrect and should be abandoned, or that a prior instruction should be disregarded. Such negating gestures may also be culturally specific and therefore may be selected for a given implementation. Examples of such negating gestures may include, but are not limited to, shaking one's head side to side, waving one or more hands side to side, or otherwise.

d) Stop gestures. Certain gestures may be associated with a need to stop. Such stopping gestures may also be culturally specific and therefore may be selected for a given implementation. Known gestures associated with a need to stop include, but are not limited to a single arm extended anteriorly, with the wrist flexed; or both arms extended anteriorly, roughly parallel to one another, with the wrists flexed.

According to an aspect of the disclosure, the one or more processors and/or the ANN may be configured to detect one or more hand gestures and/or detect a direction of one or more hand gestures. Gesture recognition has been used in many systems for different purposes. Image-data-based gesture recognition is known, and any suitable method for determining gestures in image data may be used.

Figure 9:
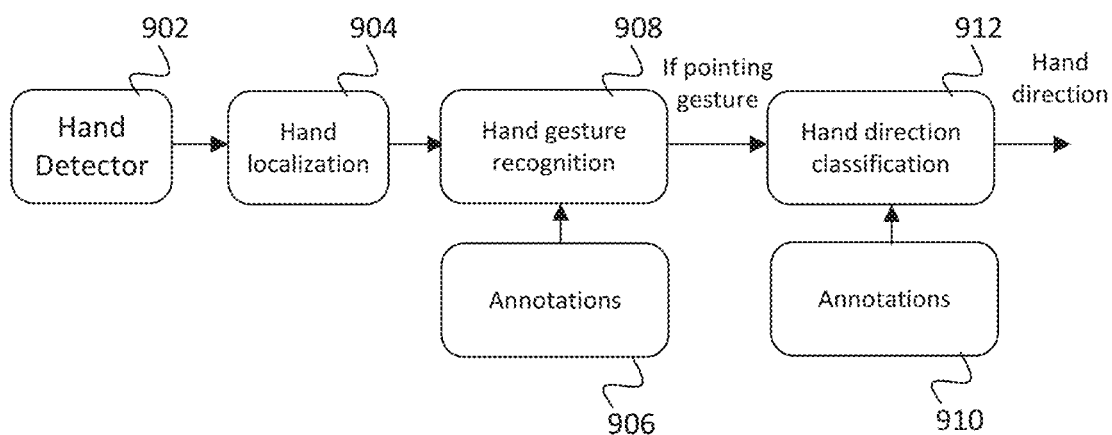
FIG. 9 depicts a hand gesture detector, which may be configured to detect one or more hand gestures or hand positions.

FIG. 9 depicts a hand gesture detector, which may be configured to detect one or more hand gestures or hand positions as described above. The hand gesture detector may include a hand detector 902, which may receive image sensor data (e.g. image sensor data from an interior facing camera/image sensor data of the vehicle's interior) and may employ one or more hand detection algorithms to detect a hand within the image sensor data. A variety of known hand detection algorithms and procedures are available. For example, known hand detection algorithms utilize skin color, hand shape, hand hull convexity, finger shape, or any of these to detect a hand. Whatever the implementation selected, the hand detector detects a hand in image data. The handle localizer 904 may then localize a location of the detected hand and output a hand position relative to the image represented by the image sensor data. Once the hand has been detected and localized, the hand gesture recognizer 908 may identify the hand gesture.

According to an aspect of the disclosure, the hand gesture recognizer 908 may be configured as an ANN (e.g., including but not limited to a CNN). For example, known implementations of a CNN as a hand gesture recognizer have shown the ability to identify from image sensor data micro hand gestures such as swipe left/right, flick down/up, tap, none, and other actions. Such a CNN can be further trained to identify other hand gestures such as pointing, attention signs, stop gestures, or any other desired hand gesture.

The next steps of the hand gesture detector depend on the determination of the hand gesture recognizer 908. If the recognized hand gesture in 908 is not a pointing gesture (e.g. it is an attention sign, a stop gesture, etc.), the hand gesture recognizer 908 may output an identification of the determined hand gesture. The determine hand gesture may be associated with one or more keywords or actions. For example, an attention sign may be treated similar to and alerting keyword, such as initially labeling the entire vicinity of the vehicle as being of heightened relevance. Based on an attention sign, the one or more processors may utilize eye gaze, other keywords, subsequent pointing, or any of these to further refine or more closely identify the object or objects within the image sensor data of heightened relevance.

If the hand gesture recognizer 908 is a pointing gesture, the hand gesture recognizer 908 may output an identifier corresponding to a pointing gesture to the hand direction classifier 912. They hand direction classifier 912 may be implemented as an ANN (e.g. including but not limited to a CNN). The hand direction classifier may be configured to determine a direction of the hand pointing.

Much like with eye gaze classification, hand direction classification may be trained on annotated data. As a general principle, it may be assumed that if the instructor is pointing, the instructor is pointing toward an object that is the subject of the instructor's keywords. As such, when a keyword is detected and when one or more keywords are utilized to identify an object of heightened relevance as described herein, annotated data identifying the object of heightened relevance (e.g. its location, its type or identity, or otherwise) may be sent to the hand direction classifier 912. Using this annotated data, the hand direction classifier 912 may compare a location of an object in a vicinity of the vehicle with a detected hand direction. By mapping the hand direction to the external image sensor data, the hand detector may determine an accuracy of the hand direction classification. That is, assuming that the object described by the keywords is the subject of the instructor's pointing, the hand direction should correspond to the location of the detected object. Any difference between the hand direction and the location of the object may be utilized in a training phase to improve the results of the hand detector.

According to another aspect of the disclosure, the one or more processors may increase or decrease a confidence that a detected object is the subject of the instructor's attention based on a pointing gesture. Humans often point to the subjects of their attention. The one or more processors may be configured to determine a pointing gesture from image sensor data (e.g. one or more cameras within the vicinity of the vehicle, one or more cameras pointed at the vehicle's occupants). The one or more processors may associate the pointing gesture with the direction, much as how a gaze is associated with the direction. The direction of the pointing gesture may then be assessed relative to external sensor data (e.g. cameras, LIDAR, RADAR) configured to detect information about an exterior or vicinity of the vehicle, and the direction of the pointing gesture may then be associated with one or more objects within the external image sensor data. Should an object in the external sensor data already have been identified (e.g. such as from a verbal keyword), the pointing gesture may be used to increase or decrease a confidence of the detected object. That is, where the object identified from a verbal keyword corresponds to an object in the direction of the pointing gesture, the confidence that the instructor's attention is directed to the object may increase. Conversely, where the object identified from a verbal keyword corresponds to an object different from the object appearing to be in the direction of the pointing gesture, the confidence that the instructor's attention is directed to the object may decrease.

According to an aspect of the disclosure, the one or more processors may be configured to attribute an increased risk level to all external sensor data during a predetermined duration relative to an alert keyword. As stated above, the predetermined duration may begin shortly prior to the speaking of the keyword, during the speaking of the keyword, or shortly after speaking of the keyword. The predetermined duration may be configurable. In this manner, a duration of heightened importance of sensor data relative to a keyword may be configured for the implementation based on any desired factors. These factors may include, but are not limited to, individual attributes of the instructor, the particular type of keyword, the particular type of danger, regional or cultural differences, etc.

During the predetermined duration of heightened relevance for sensor data, the one or more processors may be configured to utilize additional context from speech, gaze, gestures, or any of these to further specify the area of danger. This will now be described in greater detail.

Figure 10:
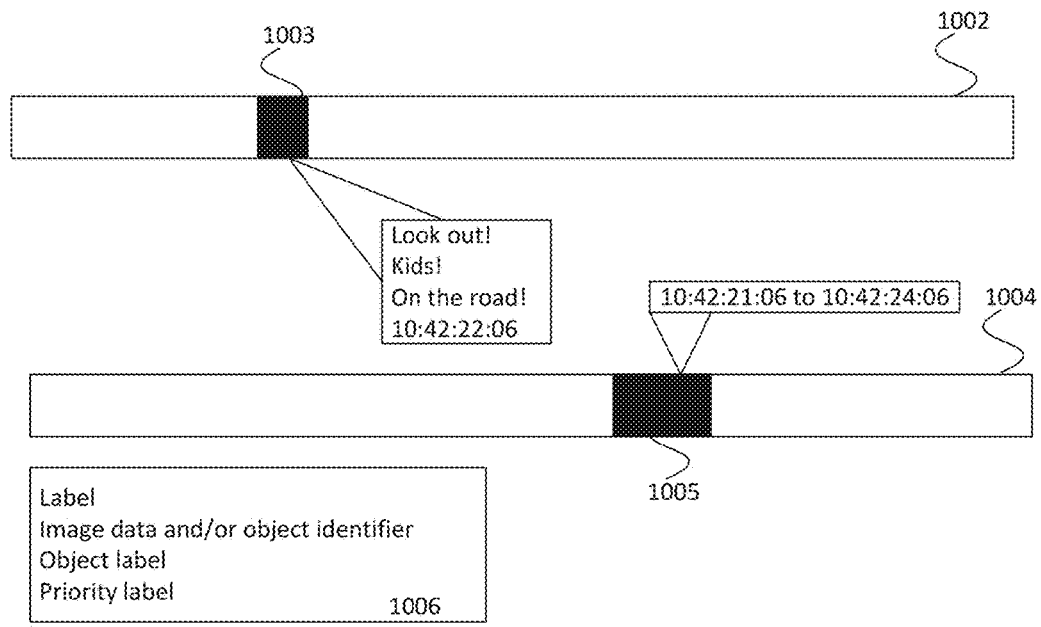
FIG. 10 depicts a data synthesizer and labeler according to an aspect of the disclosure.

FIG. 10 depicts a data synthesizer and labeler according to an aspect of the disclosure. In this figure, microphone data from the interior of the vehicle is depicted as 1002, and image sensor data corresponding to a vicinity of the vehicle is depicted as 1004. At 1003, corresponding to timestamp 10:42:22:06 (the sample timestamp is provided strict we for demonstrative purposes and is not intended to be limiting), the one or more processors detect voice data keywords. In this case, the voice data keywords include "Look out! Kids! On the road!" Having identified the voice keywords, the one or more processors may utilize timestamps of the image sensor data 1004 to identify a corresponding section of the image sensor data. The one or more processors may be configured to locate a specific portion of the image sensor data corresponding to the timestamp at 1003. Alternatively or additionally, the one or more processors may be configured to locate a portion of the image sensor data corresponding to a time slightly before and/or slightly after the timestamp at 1003. For example, and recognizing that human speech describing a danger will generally occur slightly after the danger is first appreciated, the one or more processors may be configured to consider image sensor data corresponding to 10:42:21:06 to 10:42:24:06 (e.g. one second before the keywords and two seconds after the keywords). Of course, the duration before or after the keywords that the one or more processors review is a matter of preference and implementation and should not be understood as being limiting.

Having identified a corresponding section of image sensor data 1005, the one or more processors may review the image sensor data to identify one or more objects corresponding to the microphone data keywords 1003. Continuing with the example above, the one or more processors may identify image sensor data in 1005 corresponding to children on a road. Should an object corresponding to one or more of the microphone data keywords be located in a corresponding section of image sensor data, the one or more processors may generate a label corresponding to the detected object. The specifics of the label generation may depend on the given implementation. According to an aspect of the disclosure, the label may include an image data identifier, representing a portion of the image data corresponding to the detected keywords; an object identifier, representing an identity of an object corresponding to the detected keywords; an object label, representing a name or type of the identified object; a priority label, representing a relevance of the detected object, or any of these. The label may be a part of the external image sensor data (e.g. labeled data) or may be independent of (e.g. stored separately from) the external image sensor data.

In some implementations, it may be desirable for one or more processors within the vehicle to perform the keyword and image sensor matching procedures described herein. In such a configuration, each vehicle may include one or more processors that may be configured to identify keywords and microphone data and correlate the identified keywords to objects within the image sensor data as described herein. This may be performed in real-time or with any given latency.

Figure 11:
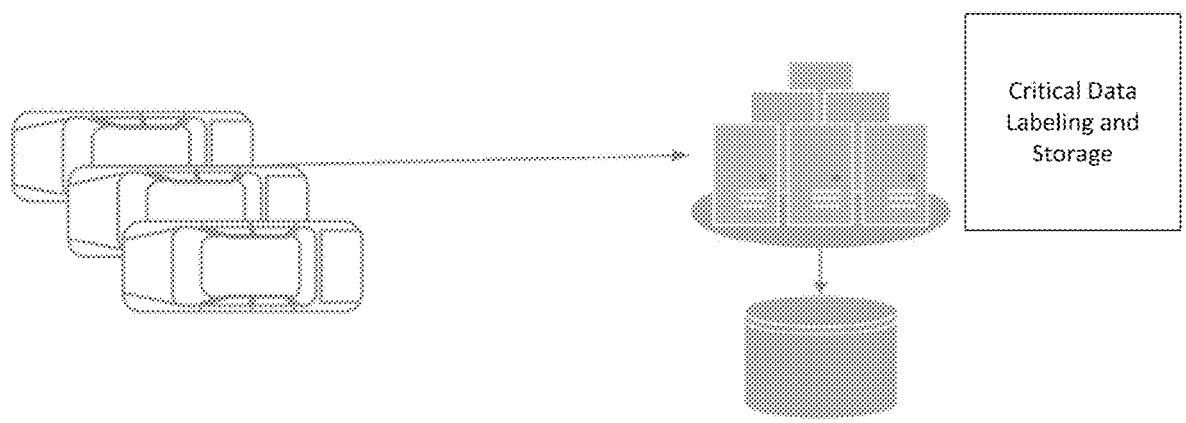
FIG. 11 depicts a data storage device, according to an aspect of the disclosure.

According to another aspect of the disclosure, it may be desirable for one or more central databases to perform the keyword and image sensor matching procedures described herein. FIG. 11 depicts a data storage device, according to an aspect of the disclosure, in which the data storage device is configured to receive microphone data and external image sensor data for label generation. In this implementation, the one or more vehicles may be equipped with one or more data storage modules, which may be configured to receive and store at least the microphone data and image sensor data. Such microphone data and image sensor data may be time-stamped to permit a temporal comparison of the data streams. The actual type of data storage module is largely immaterial but may include, and is not limited to, one or more hard drives, one or more solid-state drives, one or more optical drives, or otherwise. From time to time, the data stored within the data storage modules may be transferred to one or more central databases. This transfer may be performed using any data transfer methods, without limitation. The transfer may be performed as a wired transfer or a wireless transfer. Alternatively or additionally, one or more elements of the data storage module may be physically removed from the vehicle and connected directly with the one or more servers for upload. This configuration may be used in any given implementation. One example of such an implementation may be in the context of a driving school, in which the school utilizes a plurality of vehicles for driving instruction. The plurality of vehicles may each record and store their respective microphone data and external image sensor data, and these data may then occasionally or periodically be uploaded to a central database for processing.

Figure 12:
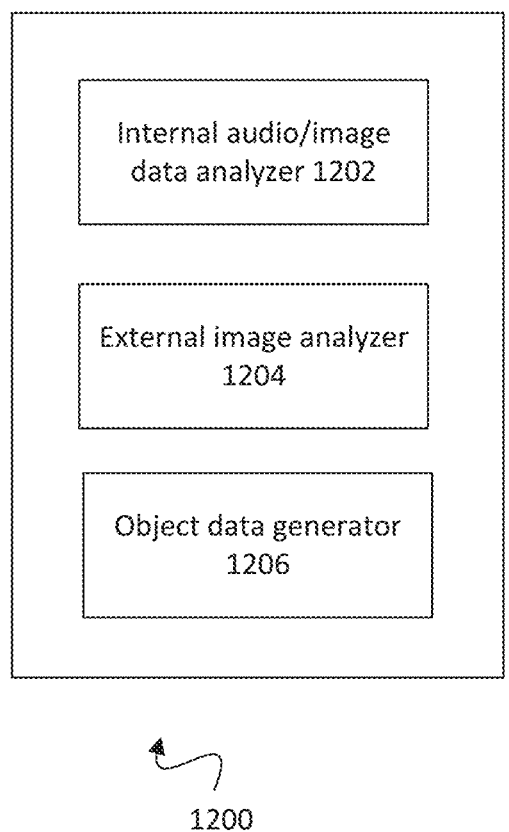
FIG. 12 depicts a vehicle data relation device, according to an aspect of the disclosure.

FIG. 12 depicts a vehicle data relation device 1200, according to an aspect of the disclosure. The vehicle data relation device may include an internal audio/image data analyzer 1202, configured to identify within first data representing at least one of audio from within the vehicle or an image from within the vehicle, second data representing an audio indicator or an image indicator, wherein the audio indicator is human speech, and wherein the image indicator represents an action of a human within the vehicle; an external image analyzer 1204, configured to identify within third data representing an image of a vicinity external to the vehicle, an object corresponding to at least one of the audio indicator or the video indicator; and an object data generator 1206, configured to generate object data to classify the third data.

FIG. 13 depicts a method of vehicle data relation, including: identifying within first data representing at least one of audio from within the vehicle or an image from within the vehicle, second data representing an audio indicator or an image indicator, wherein the audio indicator is human speech, and wherein the image indicator represents an action of a human within the vehicle; identifying within third data representing an image of a vicinity external to the vehicle, an object corresponding to at least one of the audio indicator or the video indicator; and generating object data to classify the third data.

According to an aspect of the disclosure, one or more techniques may optionally be employed to cross validate the notion of danger. For example, one or more Responsibility-Sensitive Safety algorithms or other risk evaluation procedures may be utilized, such as, for example, to determine a measure of discrepancy between the data and the estimation model.

According to an aspect of the disclosure, a level of confidence may be associated with an object identified due to a gaze direction. That is, the detection of gaze and relationship of an object in external sensor data to the detected gaze may rely on multiple variables, each having a certain margin of error. As such, a level of confidence may be assigned to the object considered to relate to the detected gaze, wherein the level of confidence indicates a likelihood or confidence that the labeled object corresponds to the gaze (e.g. represents the object being focused upon by the instructor). Various additional relationships (e.g. keywords and/or gestures) may be utilized to increase the confidence.

According to an aspect of the disclosure, a direction keyword may be utilized to increase confidence in the gaze direction and/or the object believed to correspond to the gaze direction. The instructor may not always include a direction keyword; however, if the instructor utilizes a direction keyword, the one or more processors may utilize the direction keyword to identify an object within the external sensor data believed to correspond to the instructor's attention. Where the one or more processors have already linked an object to the instructor's gaze, the addition of a direction keyword corresponding to the same object may increase a level of confidence associated with the object identification. Conversely, should the object keyword suggest an object other than an object previously identified as likely relating to the instructor's gaze, the level of confidence associated with the previously identified object may be reduced.

Using the principles and methods described herein, the one or more processors may label a dangerous condition using any of a plurality of levels of detail. That is, the one or more processors may determine a general notion of danger (e.g. such as generally identifying a danger type or an object type) or may determine a specific object associated with the danger, or even the type of danger associated with the specific object.

According to an aspect of the disclosure, the one or more processors may be configured to end the labeling session after a predetermined duration following a keyword and/or gesture. As stated above, and identified danger is most relevant in close temporal proximity to a spoken keyword or gesture, and therefore the relevance of identifying a corresponding object or labeling a corresponding danger diminishes with greater temporal removal from the keyword and/or gesture. One way to address this is to define a predetermined duration from the keyword or gesture at which time the labeling procedure ends. Illustratively, the labeling procedure may end 0.5 seconds, 1 second, 2 seconds, 5 seconds, or 10 seconds after a keyword or gesture. According to an aspect of the disclosure, this predetermined duration may be configurable, such as for a particular instruction, a particular context, a particular culture or country, or otherwise. Alternatively or additionally, the relevance of an identified object or danger may be inversely proportional to a duration of time since the keyword or gesture. In this manner, the one or more processors may be configured to assign a relevance to an object or danger (e.g. such as in the label associated with the object), and this relevance may be greater in closer temporal proximity to the keyword or gesture, and the relevance may be diminished in greater temporal proximity to the keyword or gesture.

According to an aspect of the disclosure, the subject-matter of this disclosure may permit for observation of human interaction, such as during driving-instruction rather than merely observing humans driving, as is performed in conventional autonomous vehicle training. This permits the underlying system to obtain additional information about dangerous situations that may otherwise be missed in conventional training, such as when only other traffic participants' are observed. As disclosed herein, the vehicle does not learn from copying human driving behavior, but rather how to focus on potentially dangerous situations that do not necessarily lead to a direct reaction by the human driver, but that can rather be harnessed to focus on the most relevant portions of the image sensor data. Labelling of such training data may be performed semi-automatically. That is, even though human action is used for labeling, training data may be labeled with no additional effort from human participants.

According to an aspect of the disclosure, labeled data may include the correct response to a particular scenario. That is, using the instructions as described herein, the one or more processors may locate a relevant or dangerous situation within image sensor data. Beyond merely identifying this relevant or dangerous situation, the one or more processors may record or obtain a desired response to the scenario in the form of the driver's reaction.

Additional aspects of the disclosure will be disclosed by way of example:

In Example 1, a vehicle data relation device, including: an internal audio/image data analyzer, configured to identify within first data representing at least one of audio from within the vehicle or an image from within the vehicle, second data representing an audio indicator or an image indicator, wherein the audio indicator is human speech, and wherein the image indicator represents an action of a human within the vehicle; an external image analyzer, configured to: receive third data representing an image of a vicinity external to the vehicle; identify within third data representing an image of a vicinity external to the vehicle, an object corresponding to at least one of the audio indicator or the video indicator; and an object data generator, configured to generate object data to classify the third data.

In Example 2, the vehicle data relation device of Example 1, wherein the identity of the object includes one or more coordinates defining a boundary of the object.

In Example 3, the vehicle data relation device of Example 1 or 2, wherein identifying second data includes the internal audio/image data analyzer identifying one or more keywords within the audio.

In Example 4, the vehicle data relation device of Example 3, wherein the one or more keywords include at least one of an alerting keyword, a direction keyword, a qualitative location keyword, an objection description keyword, an action keyword, or any combination thereof.

In Example 5, the vehicle data relation device of Example 3 or 4, wherein the internal audio/image data analyzer is configured to send data representing the one or more keywords to the external image analyzer and the external image analyzer is configured to identify the object based on a relationship between the object and the one or more keywords.

In Example 6, the vehicle data relation device of any one of Examples 3 to 5, wherein the external image analyzer is configured to iteratively identify the object using at least two keywords.

In Example 7, the vehicle data relation device of any one of Examples 1 to 6, wherein identifying second data includes the internal audio/image data analyzer identifying a human gesture within the video.

In Example 8, the vehicle data relation device of Example 7, wherein the human gesture is at least one of pointing in a direction, making an attention gesture, making a negating gesture, making a stop gesture, or any combination thereof.

In Example 9, the vehicle data relation device of Example 7 or 8, wherein the internal audio/image data analyzer is configured to send data representing the gesture to the external image analyzer and the external image analyzer is configured to identify the object based on a relationship between the object and the gesture.

In Example 10, the vehicle data relation device of any one of Examples 7 to 9, wherein the internal audio/image data analyzer is configured to send data representing the gesture to the external image analyzer and the external image analyzer is configured to map a pointing action to the third data and to identify the object based on a mapped relationship between the pointing action and the object.

In Example 11, the vehicle data relation device of any one of Examples 1 to 10, wherein identifying second data includes the internal audio/image data analyzer identifying a human gaze direction within the video.

In Example 12, the vehicle data relation device of Example 11, wherein internal audio/image data analyzer is configured to identify a human gaze direction by using a Viola-Jones algorithm.

In Example 13, the vehicle data relation device of Example 11, wherein internal audio/image data analyzer is configured to identify a human gaze direction by using a Viola-Jones algorithm or a similar algorithm.

In Example 14, the vehicle data relation device of any one of Examples 11 to 13, wherein internal audio/image data analyzer is configured to identify a human gaze direction by using EYE part from the Cognitive process Inference by the Mutual use of the Eye and expRession Analysis (Eye-Chimera).

In Example 15, the vehicle data relation device of any one of Examples 12 to 14, wherein internal audio/image data analyzer is configured to identify a human gaze direction by using EYE part from the Cognitive process Inference by the Mutual use of the Eye and expRession Analysis (Eye-Chimera) or a similar algorithm.

In Example 16, the vehicle data relation device of any one of Example 13 to 15, wherein the internal audio/image data analyzer is configured to send data representing the gaze direction to the external image analyzer and the external image analyzer is configured to identify the object based on a relationship between the object and the gaze direction.

In Example 17, the vehicle data relation device of any one of Examples 13 to 16, wherein the internal audio/image data analyzer is configured to send data representing the gaze direction to the external image analyzer and the external image analyzer is configured to map the gaze direction to the third data and to identify the object based on a mapped relationship between the gaze direction and the object.

In Example 18, the data analysis device of any one of Examples 1 to 17, wherein the image from within the vehicle includes an image of a driver or passenger of the vehicle.

In Example 19, the vehicle data relation device of any one of Examples 1 to 18, wherein the external image analyzer is configured to identify the object based at least two of: one or more keywords, one or more gestures, or a gaze direction.

In Example 20, the vehicle data relation device of any one of Examples 1 to 19, wherein the first data include image sensor data and/or microphone data.

In Example 21, the vehicle data relation device of any one of Examples 1 to 20, wherein the third data include image sensor data, Light Detection and Ranging (LIDAR) sensor data, Radio Detection and Ranging (RADAR) sensor data, or any combination thereof.

In Example 22, the vehicle data relation device of any one of Examples 1 to 21, further including a vehicle sensor data analyzer, configured to receive vehicle sensor data from a vehicle sensor, and wherein the external image analyzer is further configured to generate object data based on the vehicle sensor data.

In Example 23, the vehicle data relation device of Example 22, wherein the vehicle sensor includes a steering sensor, an accelerometer, a braking sensor, a speedometer, or any combination thereof.

In Example 24, the vehicle data relation device of any one of Examples 1 to 23, further including a vehicle actuator data analyzer, configured to receive actuator data, and wherein the external image analyzer is further configured to generate object data based on the vehicle actuator data.

In Example 25, the vehicle data relation device of Example 24, wherein the vehicle actuator data include data representing a steering wheel position, a brake position, a brake depression, a braking force, speed, velocity, acceleration, or any combination thereof.

In Example 26, the vehicle data relation device of any one of Examples 22 to 25, wherein the sensor data analyzer and/or the vehicle actuator data analyzer is configured to determine from the sensor data and/or vehicle actuator data an action of the vehicle relative to an object represented by the object data.

In Example 27, the vehicle data relation device of any one of Examples 1 to 26, further including an artificial neural network, wherein internal audio/image data analyzer, the external image analyzer, or the object data generator implemented as the artificial neural network.

In Example 28, the vehicle data relation device of any one of Examples 1 to 27, further including a memory, configured to store the first data, the second data, the third data, the object data, or any combination thereof.

In Example 29, the vehicle data relation device of any one of Examples 1 to 28, wherein at least two of the first data, the second data, the third data, the object data, or any combination thereof each include a time stamp, and wherein a plurality of data sources are synchronized via the time stamps.

In Example 30, the vehicle data relation device of any one of Examples 1 to 29, wherein the object data generator is configured to relate an object to the second data for a predetermined time following the audio indicator or the image indicator, and wherein the object data generator is configured not to relate the object to the second data after expiration of the predetermined time following the audio indicator or the image indicator.

In Example 31, the vehicle data relation device of any one of Examples 1 to 30, wherein the object data generator is configured to determine the priority of the object based on the audio indicator or the image indicator.

In Example 32, the vehicle data relation device of Example 31, wherein the priority is based on an importance of avoiding a collision with the object, risk of a collision with the object, an estimated damage associated with a collision with the object, or any combination thereof.

In Example 33, the vehicle data relation device of any one of Examples 1 to 32, wherein the object data include a label of one or more detected objects.

In Example 34, the vehicle data relation device of any one of Examples 1 to 33, wherein the object data generator is further configured to generate a sensor data label, wherein the sensor data label is a label representing at least one of the identity of the object, the action of the object, or the priority of the object.

In Example 35, the vehicle data relation device of Example 34, wherein the object data generator is further configured to output sensor data including the sensor data label.

In Example 36, the vehicle data relation device of Example 35 or 34, wherein the outputted sensor data include the third data and the sensor data label.

In Example 37, a non-transitory computer readable medium, including instructions which, if executed, cause one or more processors to: identify within first data representing at least one of audio from within the vehicle or an image from within the vehicle, second data representing an audio indicator or an image indicator, wherein the audio indicator is human speech, and wherein the image indicator represents an action of a human within the vehicle; identify within third data representing an image of a vicinity external to the vehicle, an object corresponding to at least one of the audio indicator or the video indicator; and an object data generator, configured to generate object data to classify the third data.

In Example 38, the non-transitory computer readable medium of Example 37, wherein the identity of the object includes one or more coordinates defining a boundary of the object.

In Example 39, the non-transitory computer readable medium of Example 37 or 38, wherein identifying second data includes identifying one or more keywords within the audio.

In Example 40, the non-transitory computer readable medium of Example 39, wherein the one or more keywords include at least one of an alerting keyword, a direction keyword, a qualitative location keyword, an objection description keyword, an action keyword, or any combination thereof.

In Example 41, the non-transitory computer readable medium of Example 39 or 40, wherein instructions are further configured to cause the one or more processors to send data representing the one or more keywords to the external image analyzer and the external image analyzer is configured to identify the object based on a relationship between the object and the one or more keywords.

In Example 42, the non-transitory computer readable medium of any one of Examples 39 to 41, wherein the external image analyzer is configured to iteratively identify the object using at least two keywords.

In Example 43, the non-transitory computer readable medium of any one of Examples 37 to 42, wherein identifying second data includes the identifying a human gesture within the video.

In Example 44, the non-transitory computer readable medium of Example 43, wherein the human gesture is at least one of pointing in a direction, making an attention gesture, making a negating gesture, making a stop gesture, or any combination thereof.

In Example 45, the non-transitory computer readable medium of any one of Examples 37 to 44, wherein identifying second data includes identifying a human gaze direction within the video.

In Example 46, the non-transitory computer readable medium of Example 45, wherein the instructions are further configured to cause the one or more processors to identify a human gaze direction by using a Viola-Jones algorithm.

In Example 47, the non-transitory computer readable medium of any one of Examples 45 or 46, wherein the instructions are further configured to cause the one or more processors to identify a human gaze direction by using EYE part from the Cognitive process Inference by the Mutual use of the Eye and expRession Analysis (Eye-Chimera).

In Example 48, the non-transitory computer readable medium of any one of Examples 45 to 47, wherein the instructions are further configured to cause the one or more processors to identify a human gaze direction by using EYE part from the Cognitive process Inference by the Mutual use of the Eye and expRession Analysis (Eye-Chimera) or a similar algorithm.

In Example 49, the data analysis device of any one of Examples 37 to 48, wherein the image from within the vehicle includes an image of a driver or passenger of the vehicle.

In Example 50, the non-transitory computer readable medium of any one of Examples 37 to 49, wherein the instructions are further configured to cause the one or more processors to identify the object based at least two of: one or more keywords, one or more gestures, or a gaze direction.

In Example 51, the non-transitory computer readable medium of any one of Examples 37 to 50, wherein the first data include image sensor data and/or microphone data.

In Example 52, the non-transitory computer readable medium of any one of Examples 37 to 51, wherein the third data include image sensor data, Light Detection and Ranging (LIDAR) sensor data, Radio Detection and Ranging (RADAR) sensor data, or any combination thereof.

In Example 53, the non-transitory computer readable medium of any one of Examples 37 to 52, wherein the instructions are further configured to cause the one or more processors to receive vehicle sensor data from a vehicle sensor and generate object data based on the vehicle sensor data.

In Example 54, the non-transitory computer readable medium of Example 53, wherein the vehicle sensor includes a steering sensor, an accelerometer, a braking sensor, a speedometer, or any combination thereof.

In Example 55, the non-transitory computer readable medium of any one of Examples 37 to 54, wherein the instructions are further configured to cause the one or more processors to receive actuator data, and wherein the external image analyzer is further configured to generate object data based on the vehicle actuator data.

In Example 56, the non-transitory computer readable medium of Example 55, wherein the vehicle actuator data include data representing a steering wheel position, a brake position, a brake depression, a braking force, speed, velocity, acceleration, or any combination thereof.

In Example 57, the non-transitory computer readable medium of any one of Examples 53 to 56, wherein the instructions are further configured to cause the one or more processors to determine from the sensor data and/or vehicle actuator data an action of the vehicle relative to an object represented by the object data.

In Example 58, the non-transitory computer readable medium of any one of Examples 37 to 57, wherein the instructions are implemented within an artificial neural network.

In Example 59, the non-transitory computer readable medium of any one of Examples 37 to 58, wherein at least two of the first data, the second data, the third data, the object data, or any combination thereof each include a time stamp, and wherein a plurality of data sources are synchronized via the time stamps.

In Example 60, the non-transitory computer readable medium of any one of Examples 37 to 59, wherein the instructions are further configured to cause the one or more processors to relate an object to the second data for a predetermined time following the audio indicator or the image indicator, and wherein object is not be related to the second data after expiration of the predetermined time following the audio indicator or the image indicator.

In Example 61, the non-transitory computer readable medium of any one of Examples 37 to 60, wherein the instructions are further configured to cause the one or more processors to determine the priority of the object based on the audio indicator or the image indicator.

In Example 62, the non-transitory computer readable medium of Example 61, wherein the priority is based on an importance of avoiding a collision with the object, risk of a collision with the object, an estimated damage associated with a collision with the object, or any combination thereof.

In Example 63, the non-transitory computer readable medium of any one of Examples 37 to 62, wherein the object data include a label of one or more detected objects.

In Example 64, the non-transitory computer readable medium of any one of Examples 37 to 63, wherein the instructions are further configured to cause the one or more processors to generate a sensor data label, wherein the sensor data label is a label representing at least one of the identity of the object, the action of the object, or the priority of the object.

In Example 65, the non-transitory computer readable medium of Example 64, wherein the instructions are further configured to cause the one or more processors to output sensor data including the sensor data label.

In Example 66, the non-transitory computer readable medium of Example 65 or 64, wherein the outputted sensor data include the third data and the sensor data label.

In Example 67, a means for vehicle data relation, including: an internal audio/image data analyzer, configured to identify within first data representing at least one of audio from within the vehicle or an image from within the vehicle, second data representing an audio indicator or an image indicator, wherein the audio indicator is human speech, and wherein the image indicator represents an action of a human within the vehicle; an external image analyzer, configured to: identify within third data representing an image of a vicinity external to the vehicle, an object corresponding to at least one of the audio indicator or the video indicator; and an object data generator, configured to generate object data to classify the third data.

In Example 68, the means for vehicle data relation of Example 67, wherein the identity of the object includes one or more coordinates defining a boundary of the object.

In Example 69, the means for vehicle data relation of Example 67 or 68, wherein identifying second data includes the internal audio/image data analyzer identifying one or more keywords within the audio.

In Example 70, the means for vehicle data relation of Example 69, wherein the one or more keywords include at least one of an alerting keyword, a direction keyword, a qualitative location keyword, an objection description keyword, an action keyword, or any combination thereof.

In Example 71, the means for vehicle data relation of Example 69 or 70, wherein the internal audio/image data analyzer is configured to send data representing the one or more keywords to the external image analyzer and the external image analyzer is configured to identify the object based on a relationship between the object and the one or more keywords.

In Example 72, the means for vehicle data relation of any one of Examples 69 to 71, wherein the external image analyzer is configured to iteratively identify the object using at least two keywords.

In Example 73, the means for vehicle data relation of any one of Examples 67 to 72, wherein identifying second data includes the internal audio/image data analyzer identifying a human gesture within the video.

In Example 74, the means for vehicle data relation of Example 73, wherein the human gesture is at least one of pointing in a direction, making an attention gesture, making a negating gesture, making a stop gesture, or any combination thereof.

In Example 75, the means for vehicle data relation of Example 73 or 74, wherein the internal audio/image analyzer is configured to send data representing the gesture to the external image analyzer and the external image analyzer is configured to identify the object based on a relationship between the object and the gesture.

In Example 76, the means for vehicle data relation of any one of Examples 73 to 75, wherein the internal audio/image data analyzer is configured to send data representing the gesture to the external image analyzer and the external image analyzer is configured to map a pointing action to the third data and to identify the object based on a mapped relationship between the pointing action and the object.

In Example 77, the means for vehicle data relation of any one of Examples 67 to 76, wherein identifying second data includes the internal audio/image data analyzer identifying a human gaze direction within the video.

In Example 78, the means for vehicle data relation of Example 77, wherein internal audio/image data analyzer is configured to identify a human gaze direction by using a Viola-Jones algorithm.

In Example 79, the means for vehicle data relation of Example 77, wherein internal audio/image data analyzer is configured to identify a human gaze direction by using a Viola-Jones algorithm or a similar algorithm.

In Example 80, the means for vehicle data relation of any one of Examples 77 to 79, wherein internal audio/image data analyzer is configured to identify a human gaze direction by using EYE part from the Cognitive process Inference by the Mutual use of the Eye and expRession Analysis (Eye-Chimera).

In Example 81, the means for vehicle data relation of any one of Examples 78 to 80, wherein internal audio/image data analyzer is configured to identify a human gaze direction by using EYE part from the Cognitive process Inference by the Mutual use of the Eye and expRession Analysis (Eye-Chimera) or a similar algorithm.

In Example 82, the means for vehicle data relation of any one of Example 79 to 81, wherein the internal audio/image data analyzer is configured to send data representing the gaze direction to the external image analyzer and the external image analyzer is configured to identify the object based on a relationship between the object and the gaze direction.

In Example 83, the means for vehicle data relation of any one of Examples 79 to 82, wherein the internal audio/image data analyzer is configured to send data representing the gaze direction to the external image analyzer and the external image analyzer is configured to map the gaze direction to the third data and to identify the object based on a mapped relationship between the gaze direction and the object.

In Example 84, the data analysis device of any one of Examples 67 to 83, wherein the image from within the vehicle includes an image of a driver or passenger of the vehicle.

In Example 85, the means for vehicle data relation of any one of Examples 67 to 84, wherein the external image analyzer is configured to identify the object based at least two of: one or more keywords, one or more gestures, or a gaze direction.

In Example 86, the means for vehicle data relation of any one of Examples 67 to 85, wherein the first data include image sensor data and/or microphone data.

In Example 87, the means for vehicle data relation of any one of Examples 67 to 86, wherein the third data include image sensor data, Light Detection and Ranging (LIDAR) sensor data, Radio Detection and Ranging (RADAR) sensor data, or any combination thereof.

In Example 88, the means for vehicle data relation of any one of Examples 67 to 87, further including a vehicle sensor data analyzer, configured to receive vehicle sensor data from a vehicle sensor, and wherein the external image analyzer is further configured to generate object data based on the vehicle sensor data.

In Example 89, the means for vehicle data relation of Example 88, wherein the vehicle sensor includes a steering sensor, an accelerometer, a braking sensor, a speedometer, or any combination thereof.

In Example 90, the means for vehicle data relation of any one of Examples 67 to 89, further including a vehicle actuator data analyzer, configured to receive actuator data, and wherein the external image analyzer is further configured to generate object data based on the vehicle actuator data.

In Example 91, the means for vehicle data relation of Example 90, wherein the vehicle actuator data include data representing a steering wheel position, a brake position, a brake depression, a braking force, speed, velocity, acceleration, or any combination thereof.

In Example 92, the means for vehicle data relation of any one of Examples 88 to 91, wherein the sensor data analyzer and/or the vehicle actuator data analyzer is configured to determine from the sensor data and/or vehicle actuator data an action of the vehicle relative to an object represented by the object data.

In Example 93, the means for vehicle data relation of any one of Examples 67 to 92, further including an artificial neural network, wherein internal audio/image data analyzer, the external image analyzer, or the object data generator implemented as the artificial neural network.

In Example 94, the means for vehicle data relation of any one of Examples 67 to 93, further including a memory, configured to store the first data, the second data, the third data, the object data, or any combination thereof.

In Example 95, the means for vehicle data relation of any one of Examples 67 to 94, wherein at least two of the first data, the second data, the third data, the object data, or any combination thereof each include a time stamp, and wherein a plurality of data sources are synchronized via the time stamps.

In Example 96, the means for vehicle data relation of any one of Examples 67 to 95, wherein the object data generator is configured to relate an object to the second data for a predetermined time following the audio indicator or the image indicator, and wherein the object data generator is configured not to relate the object to the second data after expiration of the predetermined time following the audio indicator or the image indicator.

In Example 97, the means for vehicle data relation of any one of Examples 67 to 96, wherein the object data generator is configured to determine the priority of the object based on the audio indicator or the image indicator.

In Example 98, the means for vehicle data relation of Example 97, wherein the priority is based on an importance of avoiding a collision with the object, risk of a collision with the object, an estimated damage associated with a collision with the object, or any combination thereof.

In Example 99, the means for vehicle data relation of any one of Examples 67 to 98, wherein the object data include a label of one or more detected objects.

In Example 100, the means for vehicle data relation of any one of Examples 67 to 99, wherein the object data generator is further configured to generate a sensor data label, wherein the sensor data label is a label representing at least one of the identity of the object, the action of the object, or the priority of the object.

In Example 101, the means for vehicle data relation of Example 100, wherein the object data generator is further configured to output sensor data including the sensor data label.

In Example 102, the means for vehicle data relation of Example 101 or 100, wherein the outputted sensor data include the third data and the sensor data label.

In Example 103, a method of vehicle data relation, including: identify within first data representing at least one of audio from within the vehicle or an image from within the vehicle, second data representing an audio indicator or an image indicator, wherein the audio indicator is human speech, and wherein the image indicator represents an action of a human within the vehicle; identifying within third data representing an image of a vicinity external to the vehicle, an object corresponding to at least one of the audio indicator or the video indicator; and generating object data to classify the third data.

In Example 104, the method of vehicle data relation of Example 103, wherein the identity of the object includes one or more coordinates defining a boundary of the object.

In Example 105, the method of vehicle data relation of Example 103 or 104, wherein identifying second data includes identifying one or more keywords within the audio.

In Example 106, the method of vehicle data relation of Example 105, wherein the one or more keywords include at least one of an alerting keyword, a direction keyword, a qualitative location keyword, an objection description keyword, an action keyword, or any combination thereof.

In Example 107, the method of vehicle data relation of Example 105 or 106, further including send data representing the one or more keywords to an external image analyzer and the external image analyzer is configured to identify the object based on a relationship between the object and the one or more keywords.

In Example 108, the method of vehicle data relation of any one of Examples 105 to 107, wherein the external image analyzer is configured to iteratively identify the object using at least two keywords.

In Example 109, the method of vehicle data relation of any one of Examples 103 to 108, wherein identifying second data includes identifying a human gesture within the video.

In Example 110, the method of vehicle data relation of Example 109, wherein the human gesture is at least one of pointing in a direction, making an attention gesture, making a negating gesture, making a stop gesture, or any combination thereof.

In Example 111, the method of vehicle data relation of Example 109 or 110, further including identifying the object based on a relationship between the object and the gesture.

In Example 112, the method of vehicle data relation of any one of Examples 109 to 111, further including mapping a pointing action to the third data and identifying the object based on a mapped relationship between the pointing action and the object.

In Example 113, the method of vehicle data relation of any one of Examples 103 to 112, wherein identifying second data includes the internal audio/image data analyzer identifying a human gaze direction within the video.

In Example 114, the method of vehicle data relation of Example 113, further including identifying a human gaze direction by using a Viola-Jones algorithm.

In Example 115, the method of vehicle data relation of any one of Examples 112 to 114, further including identifying a human gaze direction by using EYE part from the Cognitive process Inference by the Mutual use of the Eye and expRession Analysis (Eye-Chimera).

In Example 116, the method of vehicle data relation of any one of Examples 113 to 115, further including identify a human gaze direction by using EYE part from the Cognitive process Inference by the Mutual use of the Eye and expRession Analysis (Eye-Chimera) or a similar algorithm.

In Example 117, the method of vehicle data relation of any one of Example 114 to 116, further including identifying the object based on a relationship between the object and the gaze direction.

In Example 118, the method of vehicle data relation of any one of Examples 114 to 117, further including mapping the gaze direction to the third data and to identify the object based on a mapped relationship between the gaze direction and the object.

In Example 119, the data analysis device of any one of Examples 103 to 118, wherein the image from within the vehicle includes an image of a driver or passenger of the vehicle.

In Example 120, the method of vehicle data relation of any one of Examples 103 to 119, further including identifying the object based at least two of: one or more keywords, one or more gestures, or a gaze direction.

In Example 121, the method of vehicle data relation of any one of Examples 103 to 120, wherein the first data include image sensor data and/or microphone data.

In Example 122, the method of vehicle data relation of any one of Examples 103 to 121, wherein the third data include image sensor data, Light Detection and Ranging (LIDAR) sensor data, Radio Detection and Ranging (RADAR) sensor data, or any combination thereof.

In Example 123, the method of vehicle data relation of any one of Examples 103 to 122, further including receiving vehicle sensor data from a vehicle sensor and generating object data based on the vehicle sensor data.

In Example 124, the method of vehicle data relation of Example 123, wherein the vehicle sensor includes a steering sensor, an accelerometer, a braking sensor, a speedometer, or any combination thereof.

In Example 125, the method of vehicle data relation of any one of Examples 103 to 124, further including receiving actuator data and generating object data based on the vehicle actuator data.

In Example 126, the method of vehicle data relation of Example 125, wherein the vehicle actuator data include data representing a steering wheel position, a brake position, a brake depression, a braking force, speed, velocity, acceleration, or any combination thereof.

In Example 127, the method of vehicle data relation of any one of Examples 123 to 126, further including determining from the sensor data and/or vehicle actuator data an action of the vehicle relative to an object represented by the object data.

In Example 128, the method of vehicle data relation of any one of Examples 103 to 127, further including implementing any one or more elements of Examples 103 to 127 an in artificial neural network.

In Example 129, the method of vehicle data relation of any one of Examples 103 to 128, further including storing the first data, the second data, the third data, the object data, or any combination thereof, on a memory.

In Example 130, the method of vehicle data relation of any one of Examples 103 to 129, wherein at least two of the first data, the second data, the third data, the object data, or any combination thereof each include a time stamp, and wherein a plurality of data sources are synchronized via the time stamps.

In Example 131, the method of vehicle data relation of any one of Examples 103 to 130, further including relating an object to the second data for a predetermined time following the audio indicator or the image indicator and not relating the object to the second data after expiration of the predetermined time following the audio indicator or the image indicator.

In Example 132, the method of vehicle data relation of any one of Examples 103 to 131, further including determining the priority of the object based on the audio indicator or the image indicator.

In Example 133, the method of vehicle data relation of Example 132, wherein the priority is based on an importance of avoiding a collision with the object, risk of a collision with the object, an estimated damage associated with a collision with the object, or any combination thereof.

In Example 134, the method of vehicle data relation of any one of Examples 103 to 133, wherein the object data include a label of one or more detected objects.

In Example 135, the method of vehicle data relation of any one of Examples 103 to 134, further including generating a sensor data label, wherein the sensor data label is a label represents at least one of the identity of the object, the action of the object, or the priority of the object.

In Example 136, the method of vehicle data relation of Example 135, further including outputting sensor data including the sensor data label.

In Example 137, the method of vehicle data relation of Example 136 or 135, wherein the outputted sensor data include the third data and the sensor data label.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

What is claimed is:

1. A vehicle data relation device, comprising:
   an internal audio/image data analyzer, configured to
      identify first data representing audio data from within the vehicle or an image from within the vehicle,
      identify, from the first data, second data representing an audio indicator or an image indicator,
      wherein the audio indicator is human speech, and wherein the image indicator represents an action of a human within the vehicle;
   an external image analyzer, configured to:
      identify, within third data representing an image of a vicinity external to the vehicle, an object corresponding to at least one of the audio indicator or the image indicator; and
   an object data generator, configured to generate object data to classify the object.

2. The vehicle data device of claim 1, wherein the object data generator is configured to classify the object based on the third data's relevance in training of a trainable model.

3. The vehicle data relation device of claim 1, wherein the object data comprise at least one of an identity of the object, an action of the object, or a priority of the object.

4. The vehicle data relation device of claim 1, wherein the internal audio/image data analyzer configured to identify second data comprises the internal audio/image data analyzer configured to identify one or more keywords within the audio.

5. The vehicle data relation device of claim 4, wherein the internal audio/image data analyzer is configured to send data representing the one or more keywords to the external image analyzer, and the external image analyzer is configured to identify the object based on a relationship between the object and the one or more keywords.

6. The vehicle data relation device of claim 4, wherein the external image analyzer is configured to iteratively identify the object using at least two keywords.

7. The vehicle data relation device of claim 1, wherein the internal audio/image data analyzer being configured to identify second data comprises the internal audio/image data analyzer being configured to identify a human gesture within the image; wherein the human gesture is at least one of pointing in a direction, making an attention gesture, making a negating gesture, making a stop gesture, or any combination thereof; and
   wherein the external image analyzer is configured to identify the object within the third data based on the human gesture.

8. The vehicle data relation device of claim 7, wherein the internal audio/image data analyzer is configured to send data representing the human gesture to the external image analyzer and the external image analyzer is configured to map a pointing action to the third data and to identify the object based on a mapped relationship between the pointing action and the object.

9. The vehicle data relation device of claim 1, wherein the internal audio/image data analyzer being configured to identify second data comprises the internal audio/image data analyzer being configured to identify a human gaze direction within the image; wherein the external image analyzer is configured to identify the object within the third data based on the human gaze direction.

10. The vehicle data relation device of claim 9, wherein the internal audio/image data analyzer is configured to send data representing the gaze direction to the external image analyzer and the external image analyzer is configured to identify the object at least in part based on a relationship between the object and the gaze direction.

11. The vehicle data relation device of claim 9, wherein the internal audio/image data analyzer is configured to send data representing the gaze direction to the external image analyzer and the external image analyzer is configured to map the gaze direction to the third data and to identify the object based on a mapped relationship between the gaze direction and the object.

12. The vehicle data relation device of claim 1, wherein the external image analyzer is configured to identify the object based on at least two of: one or more keywords, one or more gestures, or a gaze direction.

13. The vehicle data relation device of claim 1, further comprising a vehicle sensor data analyzer configured to receive vehicle sensor data from a vehicle sensor, and wherein the external image analyzer is further configured to generate object data based on the vehicle sensor data, wherein the vehicle sensor comprises a steering sensor, an accelerometer, a braking sensor, a speedometer, or any combination thereof.

14. The vehicle data relation device of claim 1, further comprising a vehicle actuator data analyzer, configured to receive actuator data, and wherein the external image analyzer is further configured to generate object data based on the vehicle actuator data, wherein the vehicle actuator data comprise data representing a steering wheel position, a brake position, a brake depression, a braking force, speed, velocity, acceleration, or any combination thereof.

15. The vehicle data relation device of claim 14, wherein the sensor data analyzer and/or the vehicle actuator data analyzer is configured to determine from the sensor data and/or vehicle actuator data an action of the vehicle relative to an object represented by the object data.

16. The vehicle data relation device of claim 1, wherein the object data generator is configured to determine a priority of the object based on the audio indicator or the image indicator, wherein the priority is based on an importance of avoiding a collision with the object, risk of a collision with the object, an estimated damage associated with a collision with the object, or any combination thereof.

17. The vehicle data relation device of claim 1, wherein the object data comprise a label of one or more detected objects.

18. The vehicle data relation device of claim 1, wherein the object data generator is further configured to generate a sensor data label, wherein the sensor data label is a label representing at least one of the identity of the object, the action of the object, or the priority of the object.

19. A non-transitory computer readable medium, comprising instructions which, if executed, cause one or more processors to:
   identify first data representing audio from within a vehicle or an image from within the vehicle;
   identify, from the first data, second data representing an audio indicator or an image indicator, wherein the audio indicator is human speech from within the vehicle, and wherein the image indicator represents an action of a human within the vehicle;
   identify within third data representing an image of a vicinity external to the vehicle, an object corresponding to at least one of the audio indicator or the video indicator; and
   generate object data to classify the object.

20. The non-transitory computer readable medium of claim 19, wherein the identity of the object comprises one or more coordinates defining a boundary of the object.

21. The non-transitory computer readable medium of claim 19, wherein identifying second data comprises identifying one or more keywords within the audio.

22. The non-transitory computer readable medium of claim 21, wherein instructions are further configured to cause the one or more processors to send data representing the one or more keywords to the external image analyzer and the external image analyzer is configured to identify the object based on a relationship between the object and the one or more keywords.

23. A means for vehicle data relation, including:
   an internal audio/image data analyzer, configured to:
      identify first data representing audio from within a vehicle or an image from within the vehicle;
      identify second data representing an audio indicator or an image indicator, wherein the audio indicator is human speech from within the vehicle, and wherein the image indicator represents an action of a human within the vehicle; and
   an external image analyzer, configured to:
      identify within third data representing an image of a vicinity external to the vehicle, an object corresponding to at least one of the audio indicator or the video indicator; and an object data generator, configured to generate object data to classify the object.

* * * * *